US011900239B2

(12) United States Patent
Gu et al.

(10) Patent No.: US 11,900,239 B2
(45) Date of Patent: Feb. 13, 2024

(54) SYSTEMS AND METHODS FOR ACCELERATING SPARSE NEURAL NETWORK EXECUTION

(71) Applicant: ALIBABA GROUP HOLDING LIMITED, Grand Cayman (KY)

(72) Inventors: Zhenyu Gu, Los Altos, CA (US); Liu Liu, Goleta, CA (US); Shuangchen Li, Sunnyvale, CA (US); Yuan Xie, Sunnyvale, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 599 days.

(21) Appl. No.: 16/562,376

(22) Filed: Sep. 5, 2019

(65) Prior Publication Data

US 2021/0004665 A1    Jan. 7, 2021

Related U.S. Application Data

(60) Provisional application No. 62/869,484, filed on Jul. 1, 2019.

(51) Int. Cl.
*G06N 3/06* (2006.01)
*G06N 3/04* (2023.01)
*G06N 3/063* (2023.01)

(52) U.S. Cl.
CPC .............. *G06N 3/06* (2013.01); *G06N 3/04* (2013.01); *G06N 3/063* (2013.01)

(58) Field of Classification Search
CPC ............. G06N 3/06; G06N 3/04; G06N 3/063
See application file for complete search history.

(56) References Cited

U.S. PATENT DOCUMENTS

| 5,138,695 A | 8/1992 | Means et al. |
| 10,783,433 B1 * | 9/2020 | Proshin ................... G06N 3/08 |

(Continued)

FOREIGN PATENT DOCUMENTS

| WO | WO 2019/092698 A1 | 5/2019 | |
| WO | WO-2020187424 A1 * | 9/2020 | ............. G06N 20/00 |

OTHER PUBLICATIONS

Achlioptas, "Database-Friendly Random Projections," in Proc. 20th ACM SIGMOD-SIGACT-SIGART Symp. Principles of Database Sys. 274-81 (2001). (Year: 2001).*

(Continued)

*Primary Examiner* — Ryan C Vaughn
(74) *Attorney, Agent, or Firm* — Finnegan, Henderson, Farabow, Garrett & Dunner, LLP

(57) ABSTRACT

Systems and methods for dynamically executing sparse neural networks are provided. In one implementation, a system for providing dynamic sparsity in a neural network may include at least one memory storing instructions and at least one processor configured to execute the instructions to: reduce an input vector and a set of weights of the neural network, execute an input layer of the neural network using the reduced input vector and set of weights to generate a reduced output vector; expand the reduced output vector to a full output vector using first predictable output neurons (PONs); using a PON map, reduce a dimension of the full output vector; execute subsequent layers of the neural network using the reduced full output vector to produce a second reduced output vector; and expand the second reduced output vector to a second full output vector using second PONs.

19 Claims, 21 Drawing Sheets

(56) References Cited

U.S. PATENT DOCUMENTS

| | | |
|---|---|---|
| 2016/0092168 A1 | 3/2016 | Lutz et al. |
| 2016/0275395 A1 | 9/2016 | Amir et al. |
| 2019/0108436 A1 | 4/2019 | David et al. |
| 2019/0295228 A1* | 9/2019 | Liu .................. G06T 5/005 |
| 2020/0285944 A1* | 9/2020 | Lee ................. G06N 3/0472 |

OTHER PUBLICATIONS

Vivienne Sze et al. "Efficient Processing of Deep Neural Networks: A Tutorial and Survey." Dated Aug. 13, 2017, (pp. 1-32).
International Search Report and Written Opinion in European Application No. PCT/US2020/038966, dated Aug. 31, 2020 (17 pgs.).

* cited by examiner

SYSTEMS AND METHODS FOR ACCELERATING SPARSE NEURAL NETWORK EXECUTION

CROSS REFERENCE TO RELATED APPLICATION

The disclosure claims the benefits of priority to U.S. Provisional Application No. 62/869,484 filed Jul. 1, 2019, which is incorporated herein by reference in its entirety.

TECHNICAL FIELD

The present disclosure relates generally to the field of sparse neural networks. More specifically, and without limitation, this disclosure relates to computer-implemented systems and methods for dynamically executing sparse neural networks. This disclosure further relates to hardware accelerators for dynamically executing sparse neural networks. The systems and methods disclosed herein may be used in various neural network-based architectures, such as deep neural networks (DNNs), convolutional neural networks (CNNs), recurrent neural networks (RNNs), or the like.

BACKGROUND

Modern neural networks often include many nodes and many layers. However, this reduces efficiency in execution and increases latency. Accordingly, input sparsity, output sparsity, and weight sparsity have all been proposed, individual or in combination, to increase efficiency and reduce latency. Indeed, sparsity in an artificial neural network more accurately reflects how neurons in a human brain process information.

However, many existing techniques require costly offline sparsity calculations. Moreover, such techniques are one-size-fits-all and thus are less accurate for some inputs as compared to other inputs. Finally, such techniques often use input sparsity or output sparsity individually rather than in combination to increase accuracy, but this may result in idle processing cycles when the sparse neural network is executed.

SUMMARY

In some embodiments, a system for providing dynamic sparsity in a neural network may comprise at least one memory storing instructions and at least one processor configured to execute the instructions to perform operations. The operations may comprise reducing at least one dimension of at least one input vector to the neural network; reducing at least one dimension of a set of weights of the neural network; executing an input layer of the neural network using the reduced at least one input vector and at least some of the reduced set of weights to generate at least one reduced output vector; and expanding the at least one reduced output vector to at least one full output vector by setting values corresponding to one or more first predictable output neurons. For one or more subsequent layers of the neural network, the operations may further comprise using a predictable output neuron map, reducing at least one dimension of the at least one full output vector; executing at least one of the one or more subsequent layers using the reduced at least one full output vector to produce at least one second reduced output vector; and expanding the at least one second reduced output vector to at least one second full output vector by setting values corresponding to one or more second predictable output neurons.

In some embodiments, a method for providing dynamic sparsity in a neural network may comprise reducing at least one dimension of at least one input vector to the neural network; reducing at least one dimension of a set of weights of the neural network; executing an input layer of the neural network using the reduced at least one input vector and at least some of the reduced set of weights to generate at least one reduced output vector; and expanding the at least one reduced output vector to at least one full output vector by setting values corresponding to one or more first predictable output neurons. For one or more subsequent layers of the neural network, the method may further comprise using a predictable output neuron map, reducing at least one dimension of the at least one full output vector; executing at least one of the one or more subsequent layers using the reduced at least one full output vector to produce at least one second reduced output vector; and expanding the at least one second reduced output vector to at least one second full output vector by setting values corresponding to one or more second predictable output neurons.

In some embodiments, a non-transitory computer-readable storage medium may store a set of instructions that is executable by at least one processor to cause the processor to perform a method for providing dynamic sparsity in a neural network. The method may comprise reducing at least one dimension of at least one input vector to the neural network; reducing at least one dimension of a set of weights of the neural network; executing an input layer of the neural network using the reduced at least one input vector and at least some of the reduced set of weights to generate at least one reduced output vector; and expanding the at least one reduced output vector to at least one full output vector by setting values corresponding to one or more first predictable output neurons. For one or more subsequent layers of the neural network, the method may further comprise using a predictable output neuron map, reducing at least one dimension of the at least one full output vector; executing at least one of the one or more subsequent layers using the reduced at least one full output vector to produce at least one second reduced output vector; and expanding the at least one second reduced output vector to at least one second full output vector by setting values corresponding to one or more second predictable output neurons.

In some embodiments, a system for dynamic sparse execution of a neural network may comprise at least one global buffer configured to receive inputs for the neural network; a plurality of processing elements configured to execute activation functions for nodes of the neural network; and at least one processor. The at least one processor may be configured to: execute ternary random projection to reduce at least one dimension of the inputs from the at least one global buffer and generate a corresponding predictable output neuron map for use by the plurality of processing elements, and receive outputs from the plurality of processing elements, reduce at least one dimension of the outputs, and update the corresponding predictable output neuron map for use by the plurality of processing elements based on the reduced outputs.

In some embodiments, a method for dynamic sparse execution of a neural network may comprise providing, via a buffer, inputs for a neural network to at least one processor; executing, via the at least one processor, ternary random projection to reduce at least one dimension of the inputs; generating, via the at least one processor, a corresponding predictable output neuron map; executing, via a plurality of processing elements, one or more first activation functions of the neural network using the reduced inputs to generate first outputs; providing, via the buffer, the first outputs to the at least one processor; reducing, via the at least one processor, at least one dimension of the first outputs; updating, via the at least one processor, the corresponding predictable output neuron map based on the reduced first outputs; and executing, via the plurality of processing elements, one or more second activation functions of the neural network using the reduced first outputs to generate second outputs.

In some embodiments, a non-transitory computer-readable storage medium may store a set of instructions that is executable by a computing device to cause the computing device to perform a method for providing dynamic sparsity in a neural network. The method may comprise providing, via a buffer, inputs for a neural network to at least one processor; executing, via the at least one processor, ternary random projection to reduce at least one dimension of the inputs; generating, via the at least one processor, generate a corresponding predictable output neuron map; executing, via a plurality of processing elements, one or more first activation functions of the neural network using the reduced inputs to generate first outputs; providing, via the buffer, the first outputs to the at least one processor; reducing, via the at least one processor, at least one dimension of the first outputs; updating, via the at least one processor, the corresponding predictable output neuron map based on the reduced first outputs; and executing, via the plurality of processing elements, one or more second activation functions of the neural network using the reduced first outputs to generate second outputs.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

The disclosed embodiments relate to computer-implemented systems and methods for dynamically executing sparse neural networks. Advantageously, the exemplary embodiments can provide improved speed and power efficiency by dynamically optimizing input and output sparsity for each layer of a neural network. Embodiments of the present disclosure may be implemented and used in any neural network-based architectures. Accordingly, although described in reference to deep neural networks (DNNs), other neural network-based architectures, such as convolutional neural networks (CNNs), recurrent neural networks (RNNs), or the like, may be co-scheduled using the techniques disclosed herein to optimize input batch size.

Moreover, the disclosed embodiments include hardware accelerators for dynamically executing sparse neural networks. The hardware accelerators may provide greater speed and power efficiency as compared with execution on conventional processors, such as central processing units (CPUs) and graphics processing units (GPUs).

In view of the foregoing issues with conventional systems, embodiments of the present disclosure provide computer-implemented systems and methods for dynamically executing sparse neural networks. The systems and methods of the present disclosure may provide a technical solution to the technical problem of improving the efficiency of neural networks. The systems and methods of the present disclosure may result in faster speeds and lesser power consumption.

Figure 1:
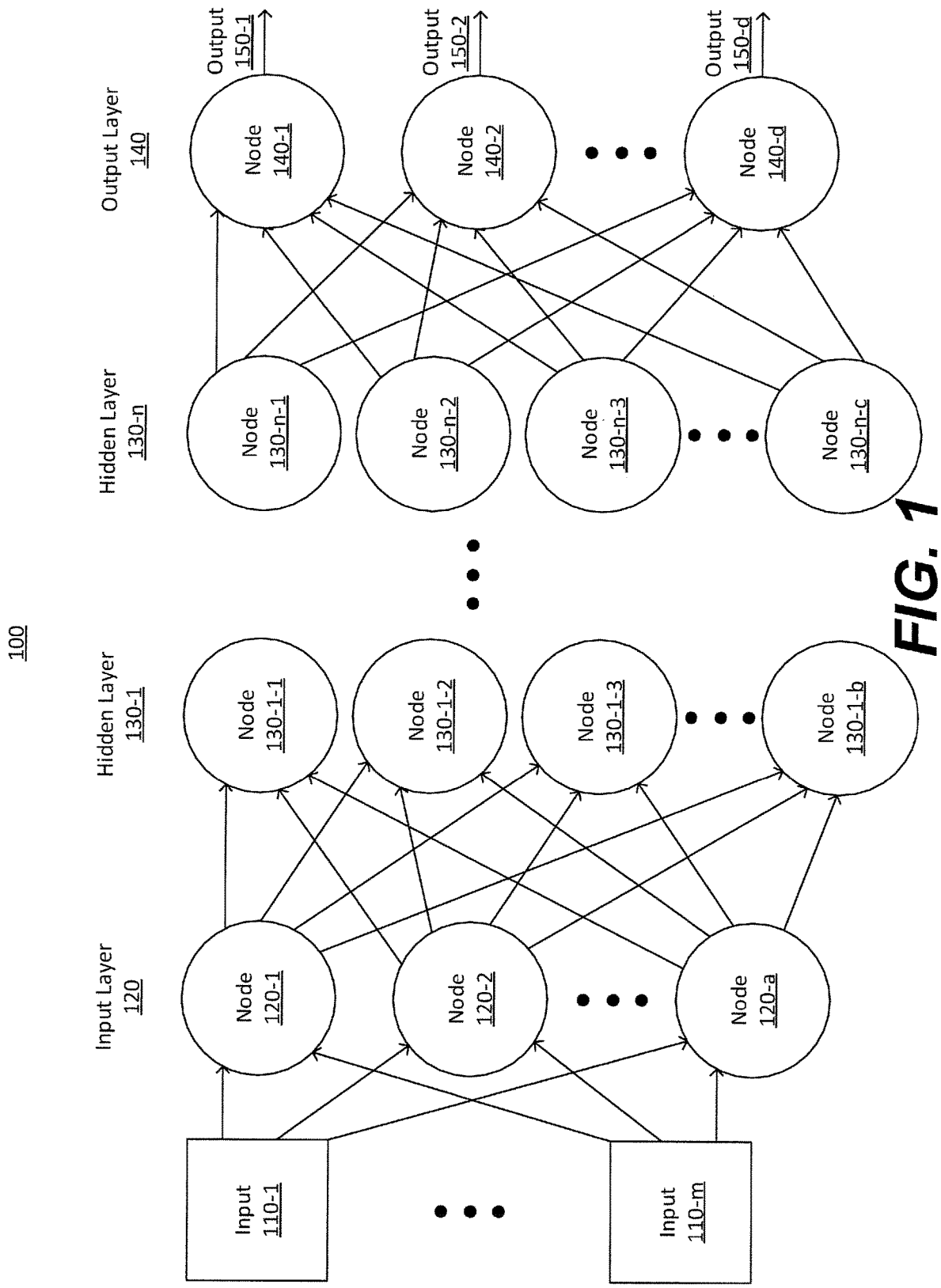
FIG. 1 is a schematic representation of a neural network, according to embodiments of the present disclosure.

FIG. 1 is a schematic representation of an artificial neural network (ANN) 100. As depicted in FIG. 1, neural network 100 may include an input layer 120 that accepts inputs, e.g., input 110-1, ..., input 110-*m*. Inputs may include an image, text, or any other structure or unstructured data for processing by neural network 100. In some embodiments, neural network 100 may accept a plurality of inputs simultaneously. For example, in FIG. 1, neural network 100 may accept up to m inputs simultaneously. Additionally or alternatively, input layer 120 may accept up to m inputs in rapid succession, e.g., such that input 110-1 is accepted by input layer 120 in one cycle, a second input is accepted by input layer 120 in a second cycle in which input layer 120 pushes data from input 110-1 to a first hidden layer, and so on. The number of inputs used in simultaneous input, rapid succession input, or the like.

Input layer 120 may comprise one or more nodes, e.g., node 120-1, node 120-2, ..., node 120-*a*. Each node may apply an activation function to corresponding input (e.g., one or more of input 110-1, ..., input 110-*m*) and weight the output from the activation function by a particular weight associated with the node. An activation function may comprise a Heaviside step function, a Gaussian function, a multiquadratic function, an inverse multiquadratic function, a sigmoidal function, or the like. A weight may comprise a positive value between 0.0 and 1.0 or any other numerical value configured to allow some nodes in a layer to have corresponding output scaled more or less than output corresponding to other nodes in the layer.

As further depicted in FIG. 1, neural network 100 may include one or more hidden layers, e.g., hidden layer 130-1, ..., hidden layer 130-*n*. Each hidden layer may comprise one or more nodes. For example, in FIG. 1, hidden layer 130-1 comprises node 130-1-1, node 130-1-2, node 130-1-3, ..., node 130-1-*b*, and hidden layer 130-*n* comprises node 130-*n*-1, node 130-*n*-2, node 130-*n*-3, ..., node 130-*n*-*c*. Similar to nodes of input layer 120, nodes of the hidden layers may apply activation functions to output from connected nodes of the previous layer and weight the output from the activation functions by particular weights associated with the nodes.

As further depicted in FIG. 1, neural network 100 may include an output layer 140 that finalizes outputs, e.g., output 150-1, output 150-2, ..., output 150-*d*. Output layer 140 may comprise one or more nodes, e.g., node 140-1, node 140-2, ..., node 140-*d*. Similar to nodes of input layer 120 and of the hidden layers, nodes of output layer 140 may apply activation functions to output from connected nodes of the previous layer and weight the output from the activation functions by particular weights associated with the nodes.

Although depicted as fully connected in FIG. 1, the layers of neural network 100 may use any connection scheme. For example, one or more layers (e.g., input layer 120, hidden layer 130-1, ..., hidden layer 130-*n*, output layer 140, or the like) may be connected using a convolutional scheme, a sparsely connected scheme, or the like. Such embodiments may use fewer connections between one layer and a previous layer than depicted in FIG. 1.

Moreover, although depicted as a feedforward network in FIG. 1, neural network 100 may additionally or alternatively use backpropagation (e.g., by using long short-term memory nodes or the like). Accordingly, although neural network 100 is depicted similar to a convolutional neural network (CNN), neural network 100 may comprise a recurrent neural network (RNN) or any other neural network.

Figure 2A:
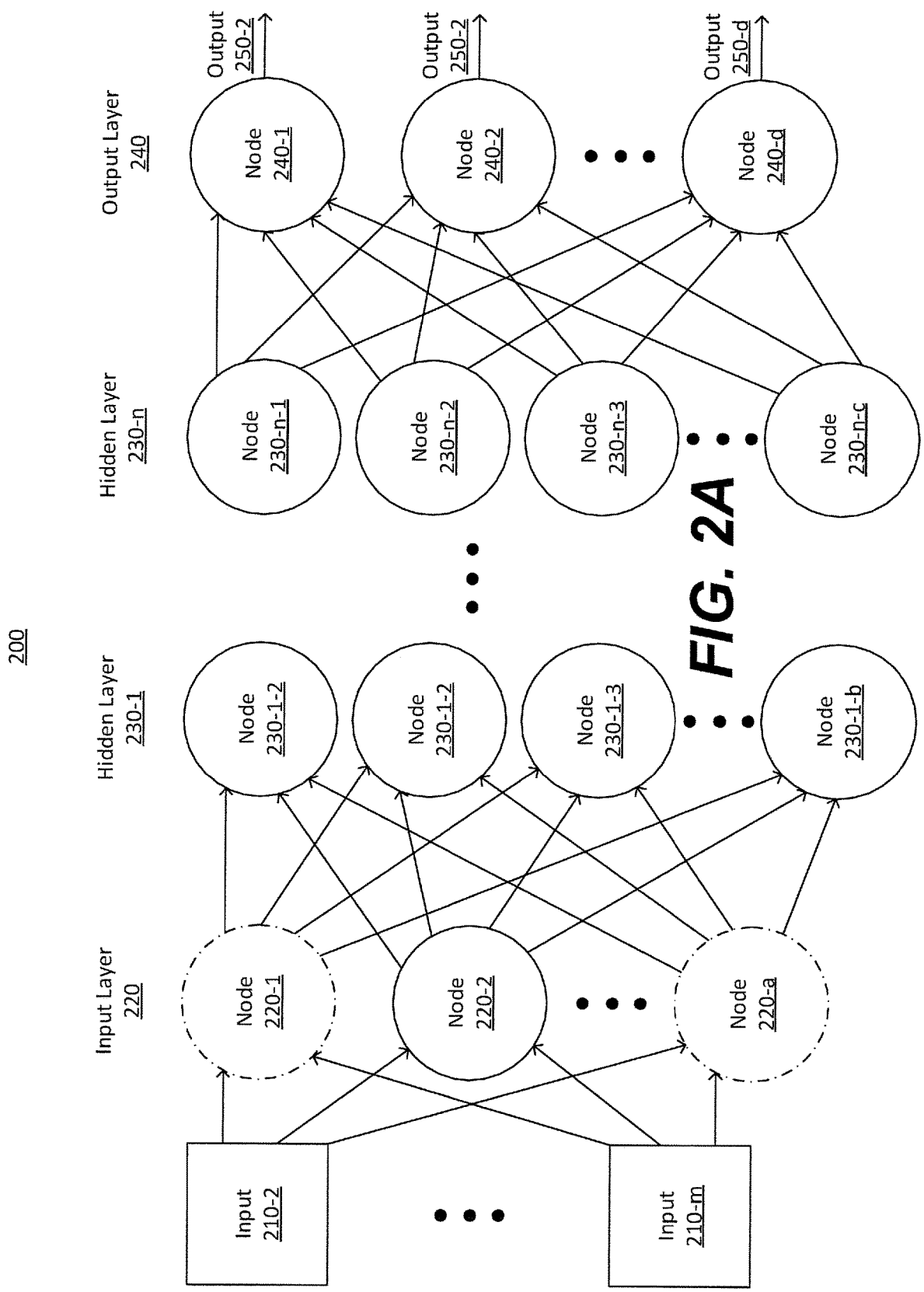
FIG. 2A is a schematic representation of an input sparse neural network, according to embodiments of the present disclosure.

FIG. 2A is a schematic representation of an artificial neural network (ANN) 200 with input sparsity. As depicted in FIG. 2A, and similar to neural network 100 of FIG. 1, neural network 200 may include an input layer 220 that accepts inputs, e.g., input 210-1, ..., input 210-*m*. Input layer 220, similar to input layer 120 of FIG. 1, may comprise one or more nodes, e.g., node 220-1, node 220-2, ..., node 220-*a*. As depicted in FIG. 2A, however, nodes 220-1 and 220-*a* may be zeroed out (e.g., by having an output automatically set to zero or any other set number, such as −1, +1, or the like), deleted (e.g., such that input passes directly through the nodes, such that no output from the nodes is passed to the next layer 230-1, or the like), or otherwise not executed in order to achieve sparsity in input layer 220.

As further depicted in FIG. 2A, and similar to neural network 100 of FIG. 1, neural network 200 may include one or more hidden layers, e.g., hidden layer 230-1, ..., hidden layer 230-*n*. Each hidden layer may comprise one or more nodes. For example, in FIG. 2A, and similar to neural network 100 of FIG. 1, hidden layer 230-1 comprises node 230-1-1, node 230-1-2, node 230-1-3, ..., node 230-1-*b*, and hidden layer 230-*n* comprises node 230-*n*-1, node 230-*n*-2, node 230-*n*-3, ..., node 230-*n*-*c*.

As further depicted in FIG. 2A, and similar to neural network 100 of FIG. 1, neural network 200 may include an output layer 240 that finalizes outputs, e.g., output 250-1, output 250-2, ..., output 250-*d*. Output layer 240, similar to output layer 140 of FIG. 1, may comprise one or more nodes, e.g., node 240-1, node 240-2, ..., node 240-*d*.

Figure 2B:
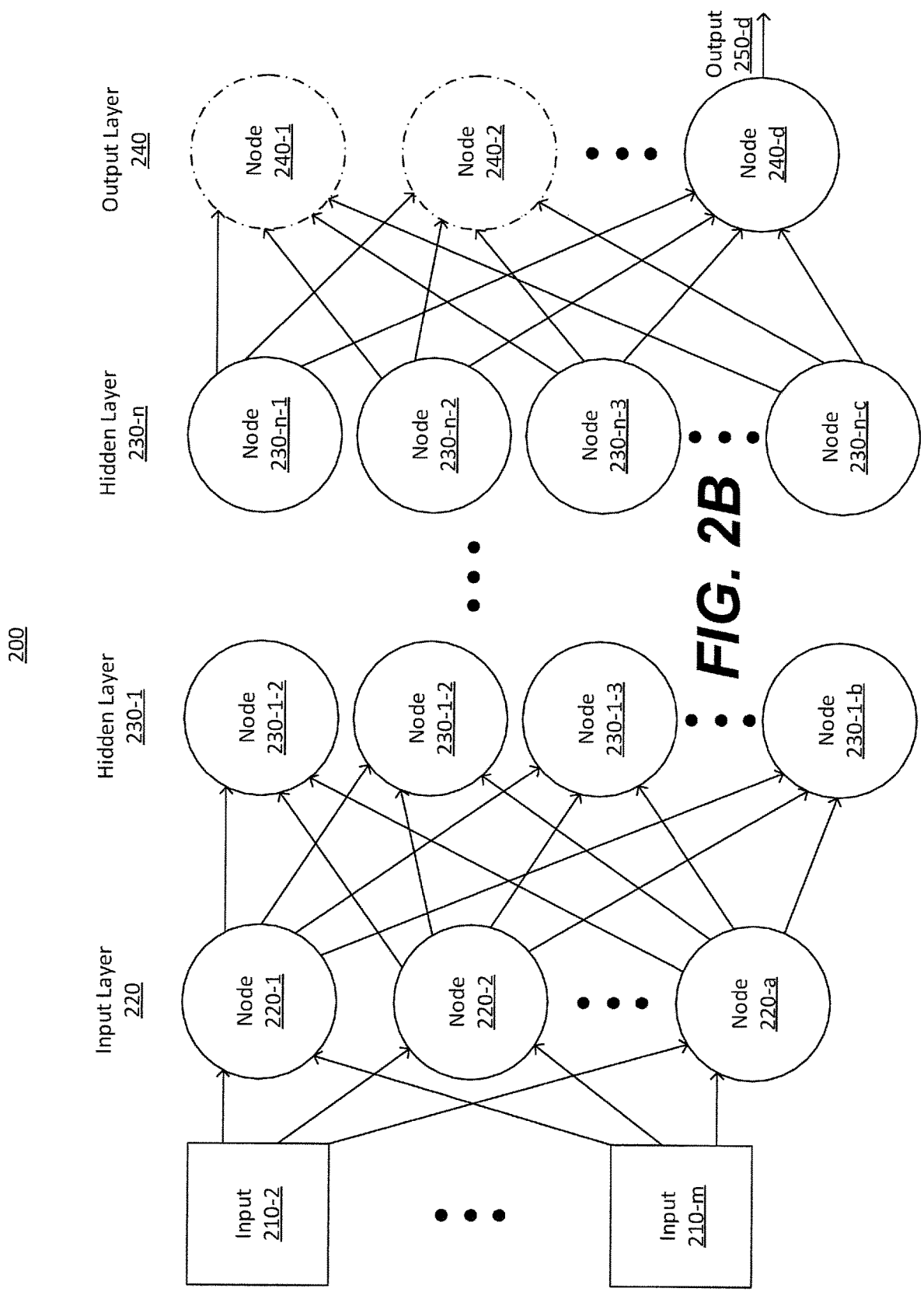
FIG. 2B is a schematic representation of an output sparse neural network, according to embodiments of the present disclosure.

FIG. 2B is a schematic representation of an artificial neural network (ANN) 200 with output sparsity. Rather than providing sparsity in input layer 220 as depicted in FIG. 2A, neural network 200 of FIG. 2B has nodes 240-1 and 240-2 zeroed out (e.g., by having an output automatically set to zero or any other set number, such as −1, +1, or the like), deleted (e.g., such that input passes directly through the nodes, such that no output from the nodes is passed to the next layer 230-1, or the like), or otherwise unexecuted in order to achieve sparsity in output layer 240.

Although depicted as fully connected in FIGS. 2A and 2B, the layers of neural network 200 may use any connection scheme. For example, one or more layers (e.g., input layer 220, hidden layer 230-1, ..., hidden layer 230-*n*, output layer 240, or the like) may be connected using a convolutional scheme, a sparsely connected scheme, or the like. Such embodiments may use fewer connections between one layer and a previous layer than depicted in FIGS. 2A and 2B.

Moreover, although depicted as a feedforward network in FIGS. 2A and 2B, neural network 200 may additionally or alternatively use backpropagation (e.g., by using long short-term memory nodes or the like). Accordingly, although neural network 200 is depicted similar to a convolutional neural network (CNN), neural network 200 may comprise a recurrent neural network (RNN) or any other neural network.

Although depicted separately in FIGS. 2A and 2B, embodiments of the present disclosure may provide both input and output sparsity when executing a neural network. Moreover, although not depicted in FIGS. 2A and 2B, embodiments of the present disclosure may additionally or alternatively provide weight sparsity (e.g., by setting to zero or to any other set number, such as −1, +1, or the like at least some of the weights multiplied by input vectors before a node operates on the input vectors) when executing a neural network.

Figure 3:
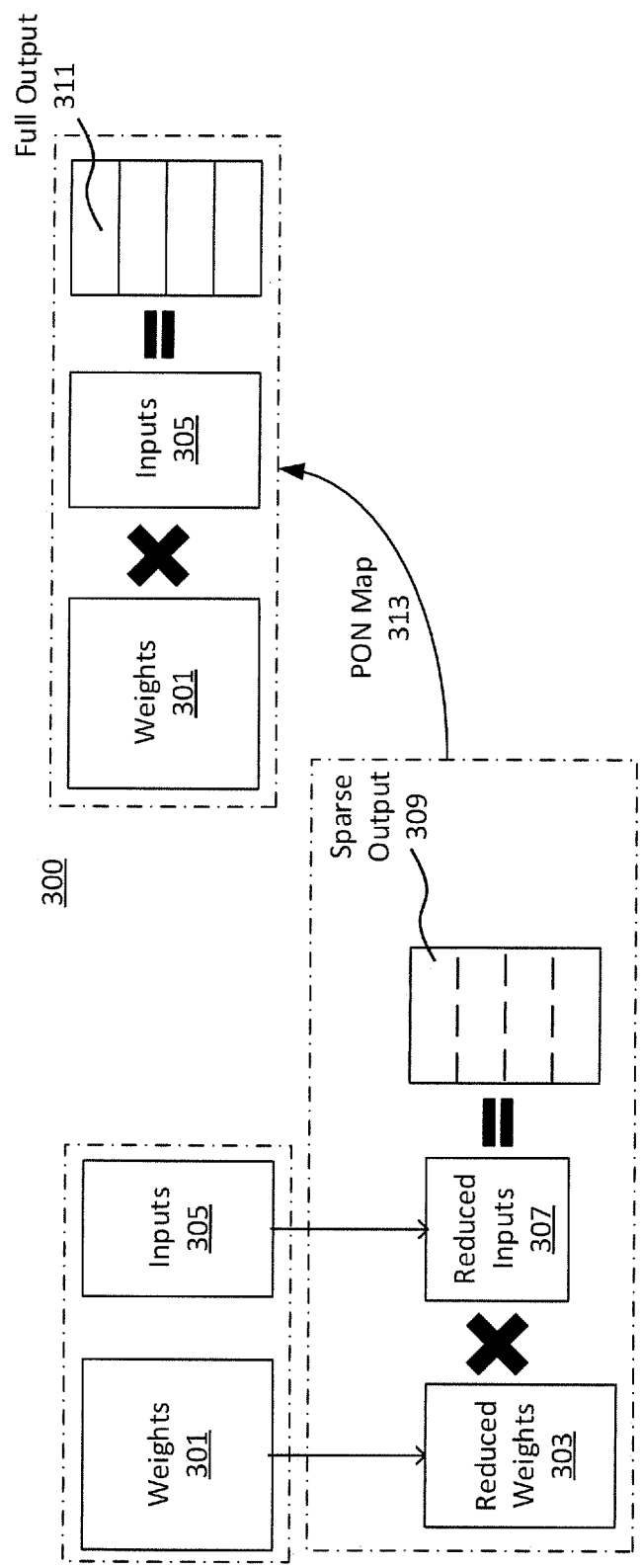
FIG. 3 is a schematic representation of dimension reduced search applied to a neural network, according to embodiments of the present disclosure.

FIG. 3 is a representation of a dimension reduced search 300 applied to a neural network 300, consistent with embodiments of the present disclosure. For example, search 300 may provide low-dimensional weighting of input vectors. The low-dimensional outputs may then be scaled back up using predictable output neurons (PONs).

Accordingly, as depicted in FIG. 3, search 300 may begin with one or more inputs 305 and corresponding weights 301. For example, as depicted in FIG. 3, inputs 305 may be stored as vectors (e.g., in an array data structure or the like) or any other appropriate data structure. Similarly, set of weights 301 may be stored as a matrix (e.g., in an array data structure or the like) or any other appropriate data structure.

Search 300 may reduce at least one dimension of inputs 305 and weights 301. For example, search 300 may use a random projection to reduce at least one dimension of inputs 305 and weights 301. In some embodiments, the random projection may be singular (e.g., to find zeroes), ternary (e.g., to find −1, 0, or +1 values), or any other random projection to remove one or more elements from inputs 305 and weights 301.

Search 300 may further multiply reduced weights 303 and reduced inputs 307 to generate a sparse output 309. For example, as depicted in FIG. 3, one or more elements of sparse output 309 may be missing compared with full output 311. Accordingly, search 300 may use a map 313 of predictable output neurons (PONs) to fill missing elements and scale sparse output 309 to an estimate of full output 311. For example, search 300 may predict output neurons that will be zero (e.g., rectified linear units (ReLUs), sigmoid gates, or the like), +1 or −1 (e.g., hyperbolic tangent gates or the like), or any other predictable value. If any missing elements from sparse output 309 are not indicated as predictable in map 313 or otherwise included in map 313, search 300 may execute a corresponding neuron to determine the missing element rather than predicting it.

Figure 4A:
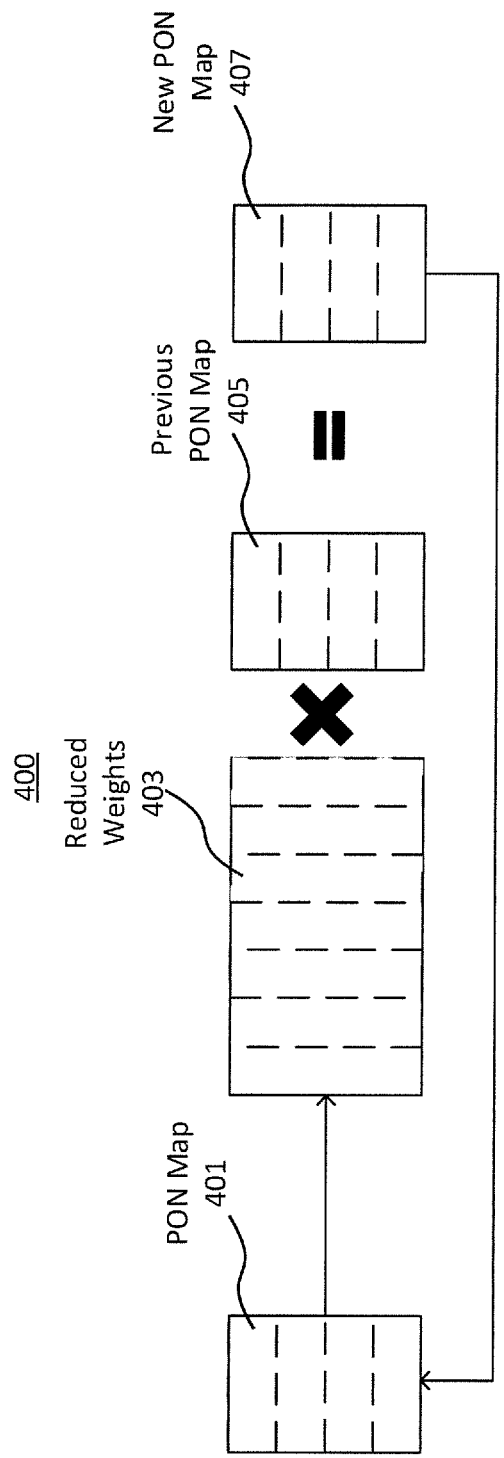
FIG. 4A is a schematic representation of applying the dimension reduced search of FIG. 3 to a convolutional neural network, according to embodiments of the present disclosure.

FIG. 4A is an example 400 of applying search 300 of FIG. 3 to a convolutional layer of a neural network. As shown in FIG. 4A, example 400 may begin by using a predictable output neuron map 401 (depicted as PON map 401 in FIG. 4A) to reduce a set of weights 403. For example, weights applied to elements predicted to be zero in predictable output neuron map 401 may be eliminated to reduce unnecessary calculations. Additionally or alternatively, weights applied to elements predicted to be −1 or +1 may be eliminated to further reduce unnecessary calculations. In example 400, the previous predictable output neuron map 405 (depicted as previous PON map 405 in FIG. 4A) may be multiplied against reduced weights 403 because previous predictable output neuron map 405 will include previous unpredictable values as well as indications of which elements are predictable and thus need not be multiplied by the weights 403 (which were correspondingly reduced by previous predictable output neuron map 405). The result is a vector 407 that is a sparse output vector, and any missing element will either be extrapolated using predictable neurons (e.g., set to zero if predicted to be zero, set to a value of a skipped weight if predicted to be +1 or −1, or the like) or calculated if not predictable. As depicted in FIG. 4A, vector 407 may also serve as a predictable output neuron map 407 (depicted as new PON map 407 in FIG. 4A) for the next round of calculations in a convolutional layer. Accordingly, embodiments of the present disclosure may propagate input sparsity in a convolutional layer as output sparsity in the next convolutional layer.

Figure 4B:
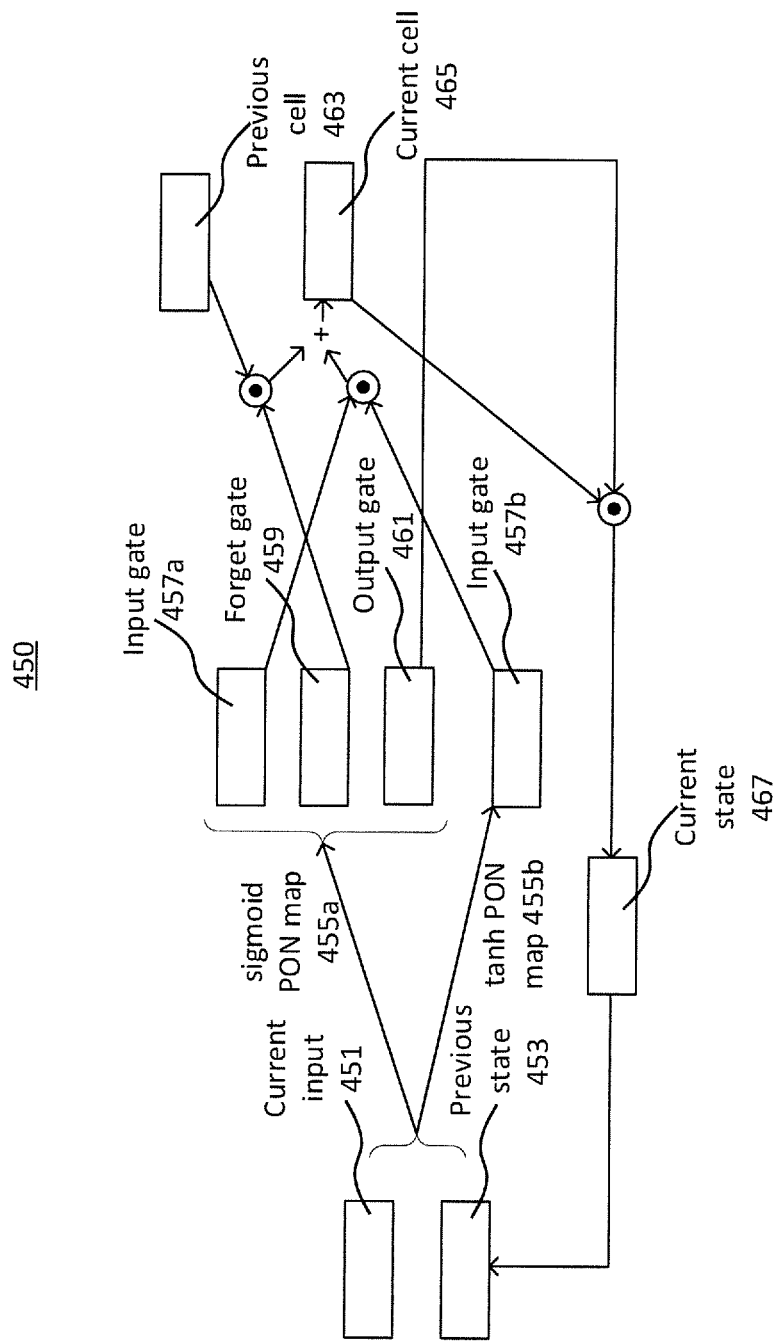
FIG. 4B is a schematic representation of applying the dimension reduced search of FIG. 3 to a long short-term memory neural network, according to embodiments of the present disclosure.

FIG. 4B is an example 450 of applying search 300 of FIG. 3 to a long short-term memory layer of a neural network. As shown in FIG. 4B, example 450 may begin by using a sigmoid predictable output neuron map 455a (depicted as sigmoid PON map 455a in FIG. 4B) and a hyperbolic tangent predictable output neuron map 455b (depicted as tanh PON map 455b in FIG. 4B) to find predictable values for input gate 457a, forget gate 459, and output gate 461 for sigmoid gates and predictable values for input gate 457b for hyperbolic tangent gates based on a current input 451 and a previous state 453. For example, sigmoid predictable output neuron map 455a may predict zero values while hyperbolic tangent predictable output neuron map 455b may predict values of +1 and −1. Accordingly, sigmoid predictable output neuron map 455a may predict zero values that propagate through current state 467 and thus, indirectly, propagate to a previous state used in the next calculation. Thus, sigmoid predictable output neuron map 455a may indirectly propagate input sparsity in a sigmoid gate as output sparsity in the next calculation. Further sparsity may be obtained through hyperbolic tangent predictable output neuron map 455b.

Although depicted using convolutional layers and long short-term memory layers in FIGS. 4A and 4B, search 300 may be used in any neural network, including combinations of any convolutional layers, fully connected layers, recurrent layers, or the like.

In some embodiments, a degree of tunability may determine initial dimension reduction (e.g., in search 300) or subsequent neuron prediction (e.g., how many elements missing from sparse output 309 are predicted rather than calculated). For example, the degree of tunability may determine how many input values are skipped (e.g., 40%, 50%, 60%, or the like) when initial dimension reduction is performed according to search 300.

Additionally or alternatively, the degree of tunability may determine a proportion of missing values that will be predicted rather than calculated (e.g., 40%, 50%, 60%, or the like). Alternatively, the degree of tunability may determine a certainty required for missing values to be predicted rather than calculated (e.g., a confidence rating of 40%, 50%, 60%, or the like; a distance of less than 0.5, 0.2, 0.1, or the like from a predicted value like 0, −1, +1, or the like; or any other measure of how close a set value is to a predicted value). In some embodiments, a first degree of tunability may determine initial dimension reduction and a second degree of tunability may determine subsequent neuron prediction.

The degree(s) of tunability may be set according to user input. Additionally or alternatively, the degree(s) of tunability may be set according to one or more overhead requirements, whether received from the user or detected based on one or more hardware components executing the neural network. For example, the degree(s) of tunability may be set according to a table relating degrees to overhead variables (e.g., processing speed, memory size, memory speed, latencies, or the like).

Figure 5:
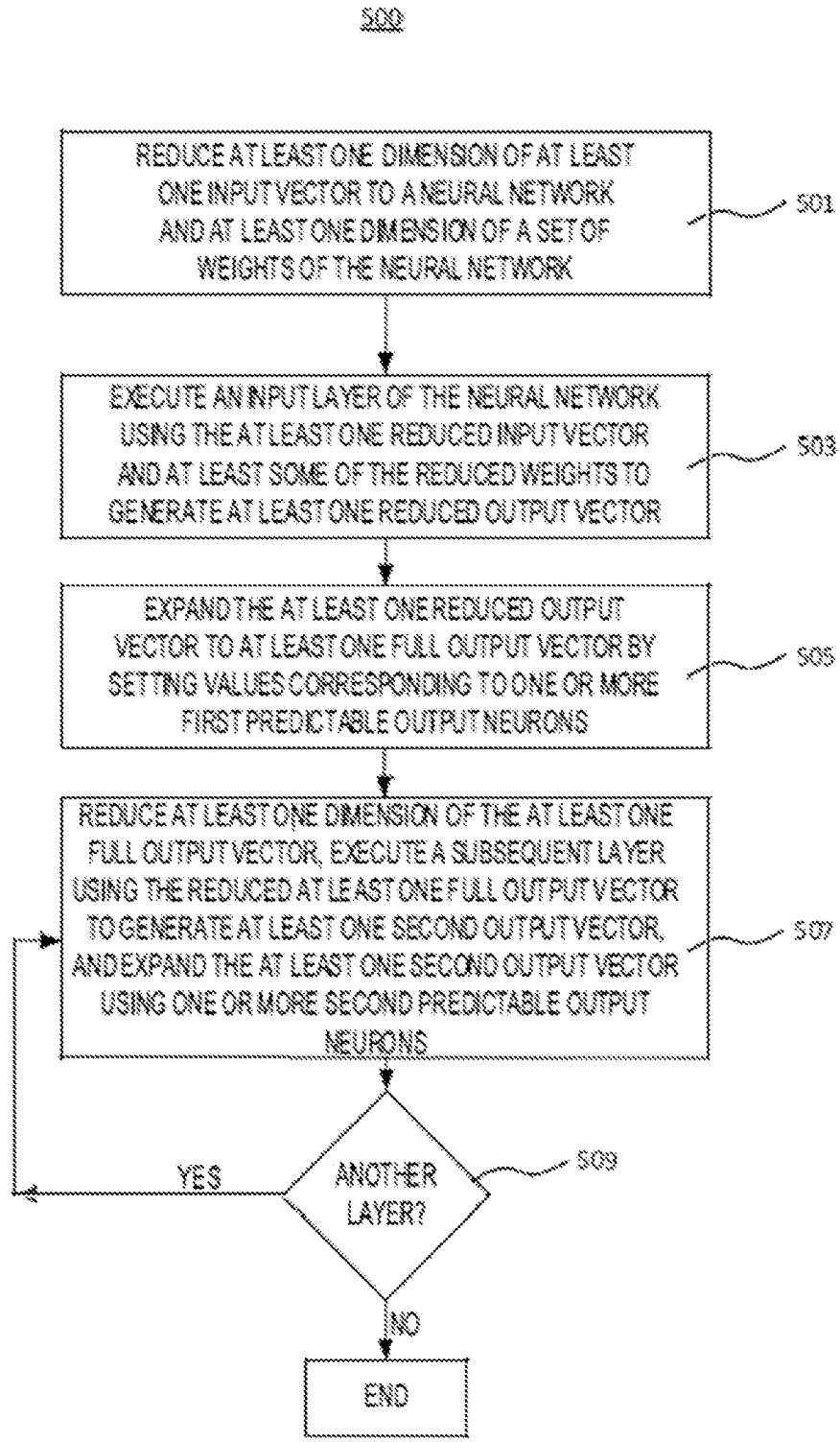
FIG. 5 is a flowchart of an exemplary method for providing dynamic sparsity in a neural network, according to embodiments of the present disclosure.

FIG. 5 is a flowchart of an exemplary method 500 for providing dynamic sparsity in a neural network. Method 500 may be performed by at least one processor (e.g., processor 601 of FIG. 6). Although described with two iterations, method 500 may be use any number of iterations to sparsely execute each layer of the neural network until the neural network is fully executed.

At step 501, the at least one processor may reduce at least one dimension of at least one input vector to the neural network and reduce at least one dimension of a set of weights of the neural network. For example, the at least one processor may perform ternary random projection as explained in search 300 of FIG. 3 above.

In embodiments where the neural network comprises at least one long short-term memory node, the at least one input vector and the set of weights may be reduced differently depending on whether the at least one input vector and the set of weights are associated with a hyperbolic tangent gate or a sigmoid gate. For example, as depicted in FIG. 4B, a first dimension reduction (and corresponding predictable output neuron map) may be used for sigmoid gates while a second dimension reduction (and corresponding predictable output neuron map) may be used for hyperbolic tangent gates. Moreover, in such embodiments, the at least one processor may perform backpropagation of the reduced output vector (e.g., current state 467 of FIG. 4B) for use in executing the one or more subsequent layers.

In some embodiments, the at least one processor may reduce at least one dimension of the at least one input vector and at least one dimension of the set of weights according to a tunable degree, which may be selected by a user or automatically selected based on one or more variables related to overhead. For example, the tunable degree may comprise 50% or lower.

At step 503, the at least one processor may execute an input layer of the neural network using the reduced at least one input vector and at least some of the reduced set of weights to generate at least one reduced output vector. For example, as depicted in FIG. 3, the at least one reduced output vector 309 may have missing elements corresponding to values removed from the at least one input vector 305 and the set of weights 301.

At step 505, the at least one processor may expand the at least one reduced output vector to at least one full output vector by setting values corresponding to one or more first predictable output neurons. For example, as depicted in FIG. 3, the at least one reduced output vector 309 may have be filled using predictable output neuron map 313.

For one or more subsequent layers of the neural network, the at least one processor may execute step 507, comprising: using a predictable output neuron map, reducing at least one dimension of the at least one full output vector; executing at least one of the one or more subsequent layers using the reduced at least one full output vector to produce at least one second reduced output vector; and expanding the at least one second reduced output vector to at least one second full output vector by setting values corresponding to one or more second predictable output neurons.

In some embodiments, the at least one processor may generate the predictable output neuron map using the one or more first predictable output neurons. For example, as depicted in FIG. 7C below, the predictable output neuron map may be updated using predictable neurons determined by adder trees 749-1, 749-2, . . . , 749-b.

In some embodiments, as explained above with respect to FIG. 3, setting values corresponding to the one or more first predictable output neurons and setting values corresponding to the one or more second predictable output neurons may comprise estimating one or more of the first predictable output neurons and the second predictable output neurons and calculating others of the first predictable output neurons and the second predictable output neurons. For example, the at least one processor may estimate the one or more of the first predictable output neurons and the second predictable output neurons based on a tunable degree, which may be selected by a user or automatically selected based on one or more variables related to overhead.

In any of the embodiments described above, the one or more first predictable output neurons and the one or more second predictable output neurons may comprise nodes with activation functions comprising at least one of a rectified linear unit (ReLU) function (e.g., as depicted in FIG. 4A), a hyperbolic tangent function (e.g., as depicted in FIG. 4B), or a sigmoid function (e.g., as depicted in FIG. 4B). Additionally or alternatively, the values corresponding to one or more first predictable output neurons and the values corresponding to one or more second predictable output neurons may comprise −1, 0, or +1.

Although described with respect to two iterations, method 500 may further iteratively reduce at least one dimension of a current output vector, execute at least one of the one or more subsequent layers using the reduced current output vector to produce a next reduced output vector, and expand the next reduced output vector by setting values corresponding to one or more next predictable output neurons until each of the one or more subsequent layers have been executed. Accordingly, the iteration may end after all layers have been executed as depicted in step 509 of FIG. 5. In such embodiments, the iteration may further include updating the predictable output neuron map using the one or more next predictable output neurons.

Figure 6:
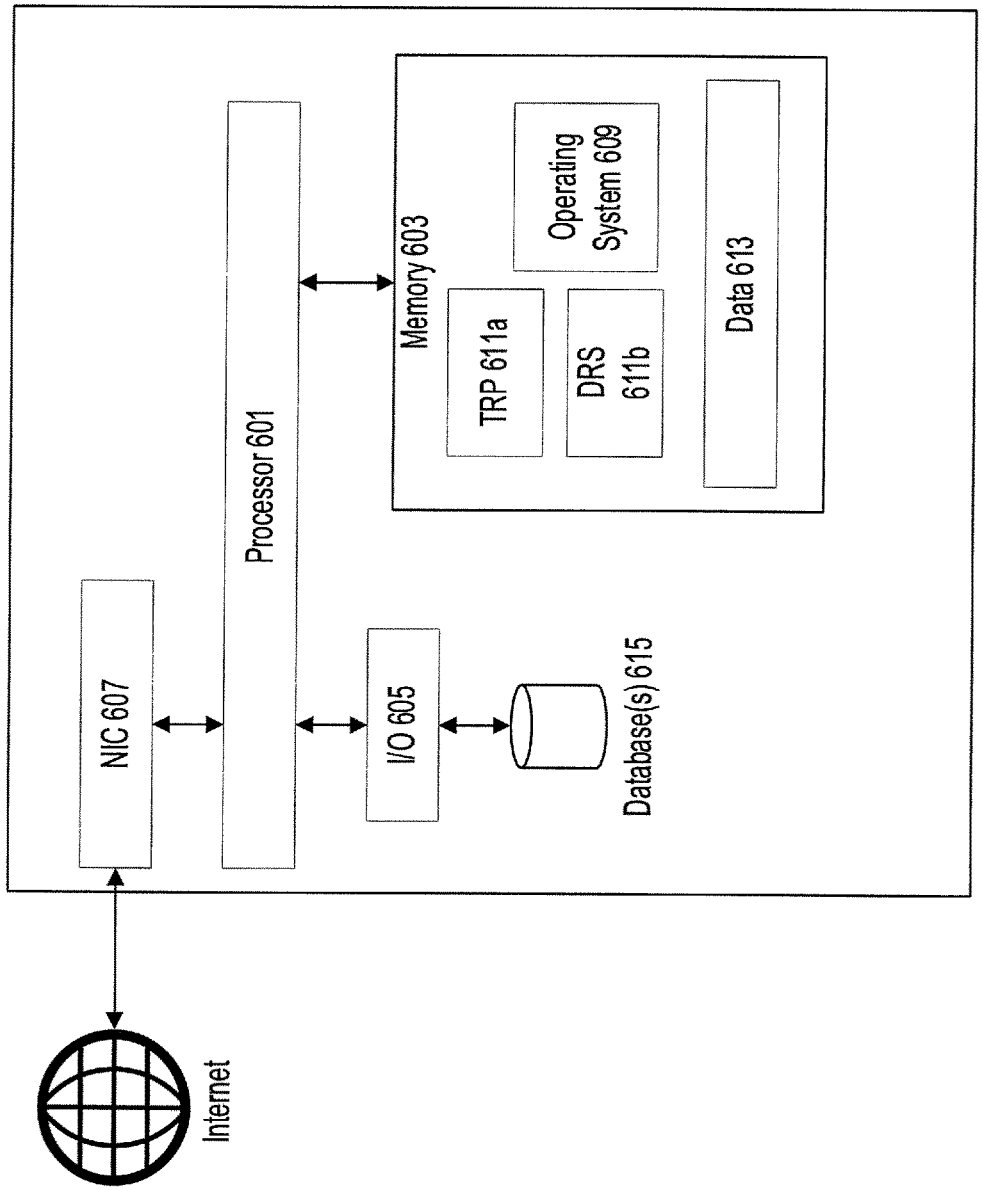
FIG. 6 is a depiction of an exemplary computer system for executing the method of FIG. 5, according to embodiments of the present disclosure.

FIG. 6 is a depiction of an example system 600 for providing dynamic sparsity in a neural network, consistent with embodiments of the present disclosure. Although depicted as a server in FIG. 6, system 600 may comprise any computer, such as a desktop computer, a laptop computer, a tablet, or the like, configured with at least one processor to execute, for example, method 500 of FIG. 5.

As depicted in FIG. 6, computer 600 may have a processor 601. Processor 601 may comprise a single processor or a plurality of processors. For example, processor 601 may comprise a CPU alone or in combination with one or more hardware accelerators, a reconfigurable array (e.g., an FPGA or other ASIC), or the like.

Processor 601 may be in operable connection with a memory 603, an input/output module 605, and a network interface controller (NIC) 607. Memory 603 may comprise a single memory or a plurality of memories. In addition, memory 603 may comprise volatile memory, non-volatile memory, or a combination thereof. As depicted in FIG. 6, memory 603 may store one or more operating systems 609, a ternary random projector 611a, and a dimension reduced search 611b. Although depicted as part of memory 603, ternary random projector 611a and dimension reduced search 611b may comprise instructions built into or stored on processor 601.

Ternary random projector 611a may include instructions to perform dimension reduction of inputs or a set of weights (e.g., as explained in search 300 of FIG. 3 and method 500 of FIG. 5), and dimension reduced search 611*b* may include instructions to fill missing values from sparse outputs using predictable output neurons (e.g., as explained in search 300 of FIG. 3 and method 500 of FIG. 5).

Input/output module 605 may store and retrieve data from one or more databases 615. For example, database(s) 615 may include a database of neural networks or predictable output neuron maps to be retrieved and used by dimension reduced search 611*b*, as described above.

NIC 607 may connect computer 600 to one or more computer networks. In the example of FIG. 6, NIC 607 connects computer 600 to the Internet. Computer 600 may receive data and instructions over a network using NIC 607 and may transmit data and instructions over a network using NIC 607. Moreover, computer 600 may receive neural networks or predictable output neuron maps (e.g., for use by dimension reduced search 611*b*) over a network using NIC 607, as described above.

Figure 7A:
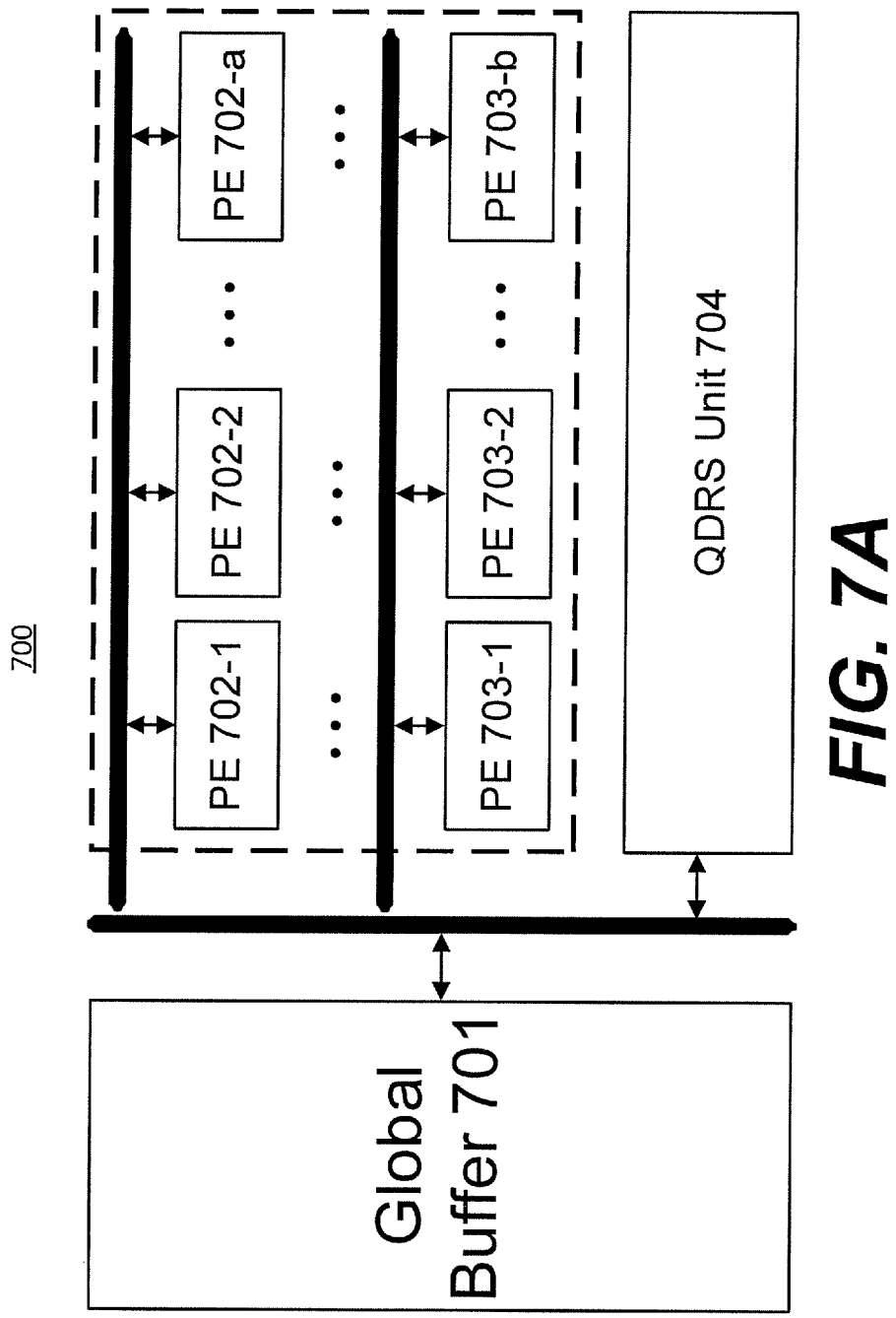
FIG. 7A is a schematic representation of a hardware accelerator for dynamically executing a sparse neural network, according to embodiments of the present disclosure.

FIG. 7A is a depiction of an example hardware accelerator 700 for dynamic execution of a sparse neural network, consistent with embodiments of the present disclosure. Although depicted separately from FIG. 6, hardware accelerator 700 may alternatively be implemented as a portion of system 600 of FIG. 6 (e.g., as at least a portion of processor 601).

As depicted in FIG. 7A, accelerator 700 comprises a plurality of processing elements (e.g., PE 702-1, 702-2, . . . , 702-*a*, 703-1, 703-2, . . . , 703-*b*), at least one global buffer 701 communicating with off-chip memory (e.g., such as a memory associated with a CPU to receive inputs for a neural network executed by accelerator 700), and at least one processor configured to implement quantized dimension reduced searching (QDRS). Global buffer 701 may further transmit final outputs to the off-chip memory.

Figure 7B:
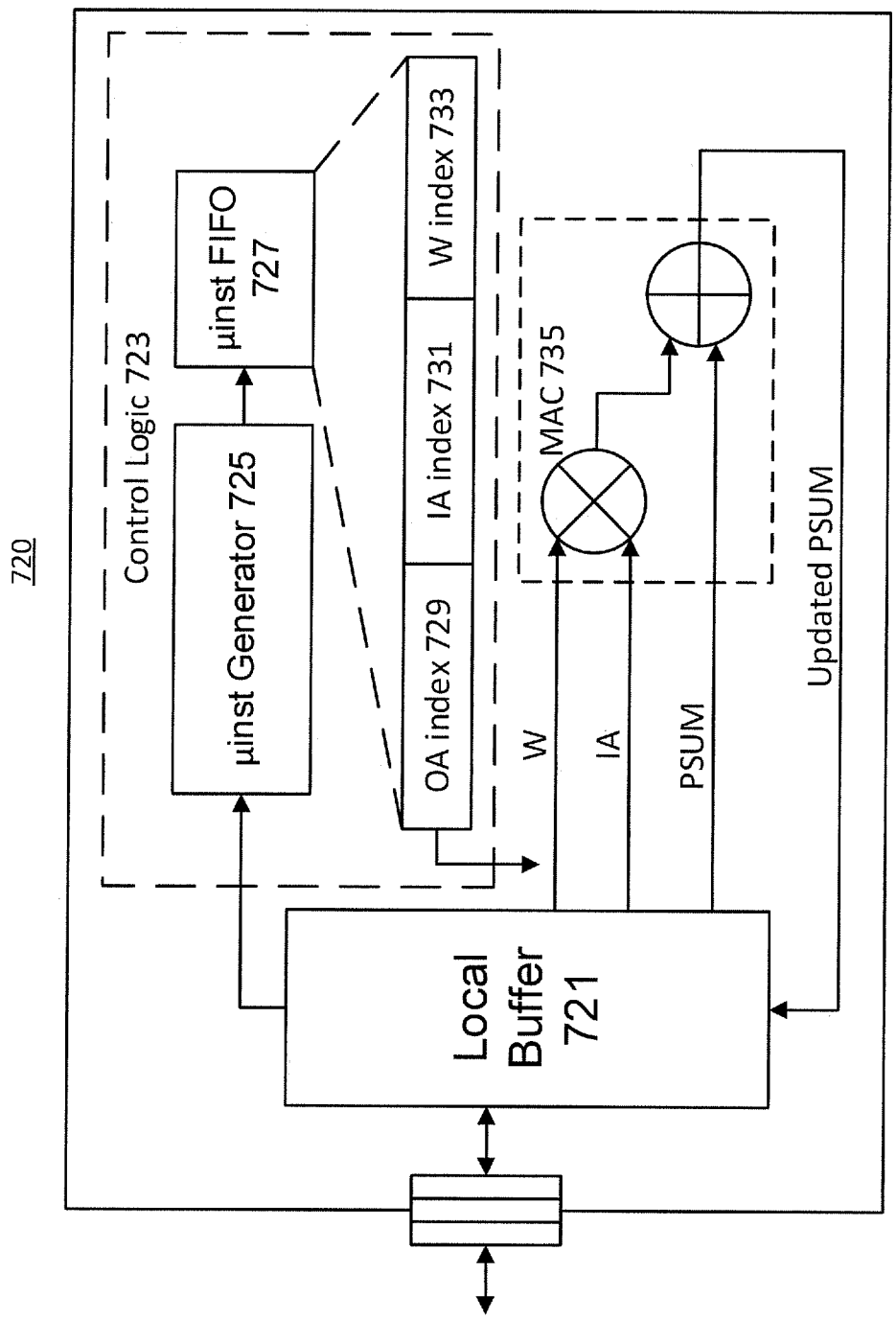
FIG. 7B is a schematic representation of a processing element in the hardware accelerator of FIG. 7A, according to embodiments of the present disclosure.
Figure 7C:
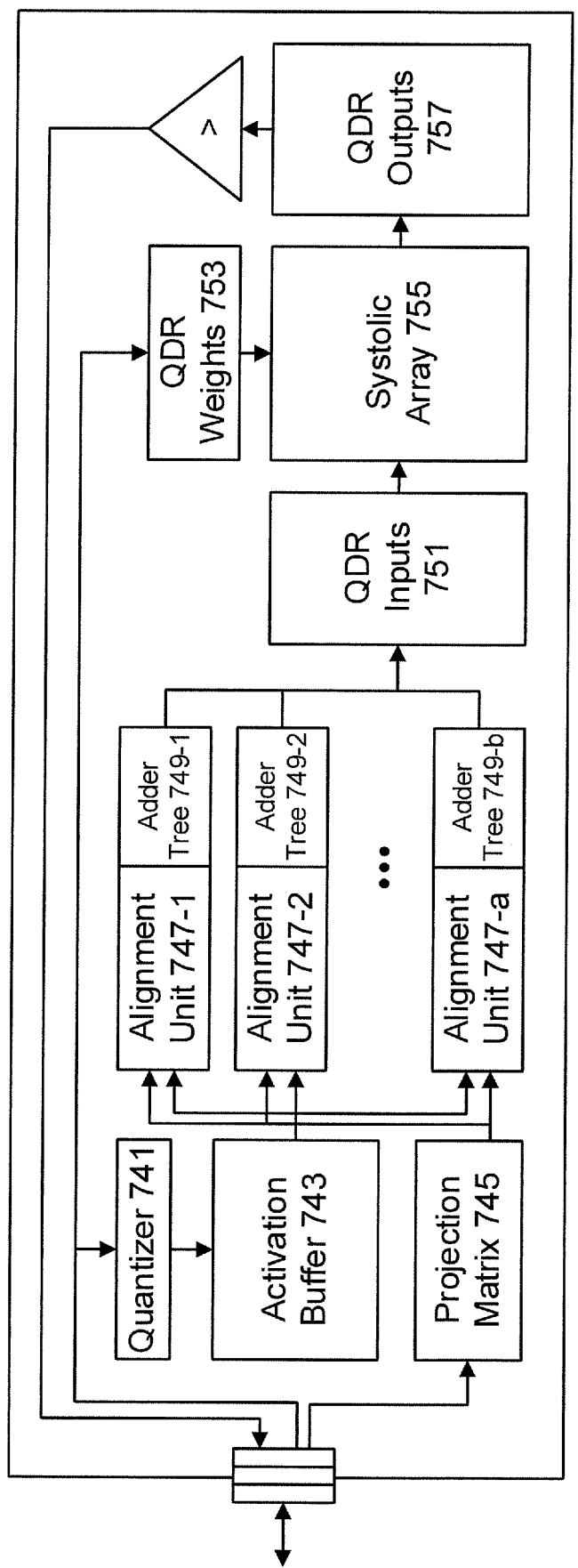
FIG. 7C is a schematic representation of the quantized dimension reduced searcher in the hardware accelerator of FIG. 7A, according to embodiments of the present disclosure.

It is appreciated that a CPU (e.g., a CPU of processor 601) can include a compiler, which can cause the CPU to push commands to accelerator 700. Based on these commands, accelerator 700 can assign any number of tasks to the plurality of processing elements or QDRS unit 704. For example, some of the instructions can instruct a direct memory access (DMA) unit of accelerator 700 to load instructions and data from CPU memory into global buffer 701 of NPU 100. The loaded instructions can then be distributed to each processing element assigned with the corresponding task, and the one or more processing elements can store these instructions into their local memories (e.g., local buffers as depicted in FIG. 7B explained below) and process them.

The plurality of processing elements may be configured to execute activation functions for nodes of the neural network or to apply weights to inputs or outputs of the nodes, e.g., as further explained with respect to FIG. 7C below. Moreover, the plurality of processing elements (e.g., PE 702-1, 702-2, . . . , 702-*a*, 703-1, 703-2, . . . , 703-*b*) and the at least one QDRS unit 704 may be configured to execute instructions in parallel. Accordingly, neuron prediction and calculation may proceed in parallel. Additionally or alternatively, QDRS unit 704 may update the predictable output neuron map on-demand. For example, the QDRS unit 704 may reduce at least one dimension of the outputs and update the corresponding predictable output neuron map concurrently with execution of one or more of the activation functions by the plurality of processing elements (e.g., PE 702-1, 702-2, . . . , 702-*a*, 703-1, 703-2, . . . , 703-*b*). It will be appreciated that QDRS unit 704 may comprise any special-purpose or general-purpose processor (and thus may also be referred to as at least one processor 704).

In one example, QDRS unit 704 may execute ternary random projection to reduce at least one dimension of the inputs from the at least one global buffer and generate a corresponding predictable output neuron map for use by the plurality of processing elements; and receive outputs from the plurality of processing elements, reduce at least one dimension of the outputs, and update the corresponding predictable output neuron map for use by the plurality of processing elements based on the reduced outputs.

As depicted in FIG. 7A, the plurality of processing elements (e.g., PE 702-1, 702-2, . . . , 702-*a*, 703-1, 703-2, . . . , 703-*b*) are organized in an array along a first dimension and a second dimension. Moreover, the plurality of processing elements (e.g., PE 702-1, 702-2, . . . , 702-*a*, 703-1, 703-2, . . . , 703-*b*) may share a first bus along the first dimension (e.g., the bus along the x-direction) and communicate with the global buffer using a second bus along the second dimension (e.g., the bus along the y-direction). Any other organization may be used for accelerator 700, however, such as a star pattern, a ring pattern, or the like.

As further depicted in FIG. 7A, the global buffer 701 may transmit the predictable output neuron map from the QDRS unit 704 to the plurality of processing elements (e.g., PE 702-1, 702-2, . . . , 702-*a*, 703-1, 703-2, . . . , 703-*b*) and transmit the outputs from the plurality of processing elements (e.g., PE 702-1, 702-2, . . . , 702-*a*, 703-1, 703-2, . . . , 703-*b*) to the QDRS unit 704.

To execute a neural network, accelerator 700 may provide, via buffer 701, inputs for a neural network to QDRS unit 704 and execute, via the QDRS unit 704, ternary random projection to reduce at least one dimension of the inputs. For example, QDRS unit 704 may perform ternary random projection to reduce at least one dimension of inputs as explained in search 300 of FIG. 3 above.

Accelerator 700 may further generate, via the QDRS unit 704, a corresponding predictable output neuron map and execute, via a plurality of processing elements (e.g., PE 702-1, 702-2, . . . , 702-*a*, 703-1, 703-2, . . . , 703-*b*), one or more first activation functions of the neural network using the reduced inputs to generate first outputs.

Accelerator 700 may provide, via the buffer 701, the first outputs to the QDRS unit 704 and reduce, via the QDRS unit 704, at least one dimension of the first outputs. Moreover, accelerator 700 may update, via the QDRS unit 704, the corresponding predictable output neuron map based on the reduced first outputs and execute, via the plurality of processing elements (e.g., PE 702-1, 702-2, . . . , 702-*a*, 703-1, 703-2, . . . , 703-*b*), one or more second activation functions of the neural network using the reduced first outputs to generate second outputs.

Although described with respect to two iterations, the QDRS unit 704 may further iteratively receive current outputs from the plurality of processing elements, reduce at least one dimension of the current outputs, and update the corresponding predictable output neuron map, based on the reduced current outputs, for use by the plurality of processing elements in generating next outputs until the plurality of processing elements have executed each layer of the neural network. Thus, accelerator 700 may use a sparsity map generated from a current layer for indicating output sparsity and also carry the same map to a next layer as an input sparsity map. Therefore, the PEs (e.g., PE 702-1, 702-2, . . . , 702-*a*, 703-1, 703-2, . . . , 703-*b*) may generate MAC instructions based on both input and output sparsity maps, which may enable the data mapping scheme to balance the workloads among PEs (e.g., PE 702-1, 702-2, ..., 702-a, 703-1, 703-2, ..., 703-b), which may be referred to as "adaptive mapping" herein.

Thus, accelerator 700 may provide adaptive mapping. For example, the QDRS unit 704 may re-assign the nodes to the plurality of processing elements (e.g., PE 702-1, 702-2, ..., 702-a, 703-1, 703-2, ..., 703-b) whenever the predictable output neuron map is updated. In such embodiments, re-assigning may comprise grouping the activation functions based on the predictable output neuron map such that each group has approximately the same number of calculations.

Such adaptive mapping may be possible because embodiments of the present disclosure provide a sparsity map before mapping, e.g., via the QDRS unit 704. Indeed, output sparsity is a major source of workload imbalance in extant techniques. In embodiments of the present disclosure, QDRS unit 704 may group all sub-tiles of a layer sharing the same inputs into several groups based on the workload amount of each sub-tile, e.g., the number of unpredictable output neurons in the sparsity map. Then, instead of assigning output sub-tiles to the Pes sequentially as extant techniques do, embodiments of the present disclosure may select the output sub-tiles from the same group and assign them to the Pes. The Pes may thus load the corresponding weight vectors for calculation, as described below with respect to FIG. 7B. This may result in an execution step that is more balanced and has fewer idle cycles than conventional mapping techniques.

Additionally, accesses to weight vectors of predictable output neurons (e.g., from an off-chip memory) may also be reduced to increase efficiency and save power. By removing predictable output neuron calculations in a high-dimensional space (i.e., providing output sparsity), embodiments of the present disclosure may skip accessing whole rows in the set of weights (e.g., weight matrix). This skipping may be more regular than element-wise sparsity implemented in extant techniques and thus may be more hardware-friendly with negligible index overhead. Although FIG. 7A depicts exploitation of operation reduction induced by both input and output sparsity, accelerator 700 only utilizes access reduction induced by output sparsity. However, other embodiments of accelerator 700 may further utilize access reduction in two directions (e.g., the x-direction and y-direction of FIG. 7A).

FIG. 7B is a depiction of an example processing element 720, e.g., as used in hardware accelerator 700 of FIG. 7A, consistent with embodiments of the present disclosure. As depicted in FIG. 7B, the processing element 720 may comprise a local buffer 721. For example, local buffer 721 may store instructions from global buffer 701, instructions from QDRS unit 704, or output from the processing element 720 before outputting it to QDRS unit 704 or an off-chip memory (e.g., via global buffer 701).

As depicted in FIG. 7B, the processing element 720 may comprise a control logic 723. For example, control logic 723 may generate microinstructions (e.g., via microinstruction generator 725) for execution according to an arbiter (e.g., FIFO 727). The microinstructions may configure processing element 720 according to instructions from QDRS unit 704, e.g., to execute an activation function or to use the multiply-accumulate (MAC) accelerator 735. As depicted in FIG. 7B, microinstruction generator 725 may use output activation (OA) index 729, input activation (IA) index 731, and weight (W) index 733 to generate appropriate instructions. Moreover, MAC accelerator 735 may combine weight (W), an input activation (IA), and previous sum (PSUM) to generate an updated sum ("updated PUSM").

As explained above, each hidden layer of the neural network may generate the sparsity map during runtime that indicates the predictable output neuron indexes. Only unpredictable neurons need computations in high-dimensional space, and the sparsity map may be saved and propagated to the next layer as an input sparsity map, explained above. Thus, microinstruction generator 725 may read sparsity maps (e.g., from QDRS unit 704), write microinstructions accordingly, and mark each microinstruction valid or invalid. At each cycle, a priority encoder may find the first valid microinstruction in the FIFO 727 and execute the same. The results of the execution may be saved in local buffer 721 before being returned to QDRS unit 704 for use in the next cycle or to global buffer 701 for output.

FIG. 7C is a depiction of an example quantized dimension reduced searcher (QDRS) unit 740, e.g., as used in hardware accelerator 700 of FIG. 7A, consistent with embodiments of the present disclosure. As depicted in FIG. 7C, QDRS unit 740 may comprise a quantizer 741 configured to truncate the inputs before reducing at least one dimension of the inputs. For example, the truncation may comprise a truncation from 16-bit fixed-point values to 4-bit fixed-point values. Accordingly, in such an example, accelerator 700 may use 16-bit fixed-point precision in high-dimensional space for sparse model execution such that input neuron vectors in original high-dimensional space may be quantized to 4-bit fixed-point values. For example, the conversion from 16-bit fixed-point to 4-bit fixed-point may comprise truncating the four most significant bits and shifting the scaling factor by 12 bits.

As further depicted in FIG. 7C, QDRS unit 740 may further comprise an activation buffer 743 and projection matrix 745 for supplying a plurality of adder trees (e.g., adder trees 749-1, 749-2, ..., 749-b, depicted as paired with alignment units 747-1, 747-2, ..., 747-a, respectively). Thus, QDRS unit 740 may implement pipelined adder trees for projection matrix 745, e.g., to implement ternary projection and remove multiplications. QDRS unit 740 may first change the signs of input activations according to projection matrix 745, and then start the adder trees, which may perform accumulation of sign-modified input activation. This carry-save-adder tree structure executed in pipeline may provide high throughput when QDRS unit 740 performs dimension reduction.

As further depicted in FIG. 7C, QDRS unit 740 may comprise a systolic array 755 configured to reduce at least one dimension of a set of weights 753 for the neural network based on the reduced inputs 751. In such embodiments, the systolic array 755 may be further configured to reduce at least one dimension of the set of weights 753 for the neural network based on reduced outputs (e.g., received from processing elements not depicted in FIG. 7C).

Accordingly, after quantization and projection, QDRS unit 740 may use inputs 751 and weights 753 in low precision and low dimension in normal MAC operations using systolic array 755. The resulting estimated output activations 757 from systolic array 755 may be compared with a predetermined threshold (e.g., a degree of tunability) to generate a map of predictable output neurons (e.g., showing neurons that need not be calculated). The predetermined threshold may be selected according to an activation function (e.g. ReLU, sigmoid, tanh, or the like).

Accordingly, FIG. 7C depicts QDRS unit 740 loading a ternary projection matrix 745 into the buffer, loading activations 743 from the previous layer and quantizing the same during runtime, executing ternary random projection using adder trees (e.g., adder trees 749-1, 749-2, ..., 749-b) after setting the activation signs, and generating the predictable output neuron map that will be sent to the processing element array for consequent high-dimensional computations. Thus, QDRS unit 740 may execute QDRS in a decoupled design such that speculation and PE execution may work in parallel, as explained above. For example, once a tile of output activations in a previous layer is generated and sent back to the global buffer 701, the tile may be loaded into the QDRS unit 740 to perform QDRS for the next layer. Indeed, in some embodiments, QDRS unit 740 may receive output activations on-demand rather than awaiting an entire tile.

Although depicted as specialized hardware in FIGS. 7A and 7B, each processing element may include or a processor or a core. Additionally or alternatively, although depicted as specialized hardware in FIGS. 7A and 7C, the QDRS unit 704/740 may include a processor.

EXAMPLE

Multiple simulations were developed and executed in order to demonstrate potential efficiency and energy gains by using the disclosed techniques for dynamic execution of sparse neural networks. The simulations integrated cycle-level simulations with a deep learning framework (e.g., PyTorch). Register-transfer level (RTL) design abstraction was used for the hardware accelerator depicted in FIGS. 7A, 7B, and 7C: Table 1 below shows the specifications used by the hardware accelerator in the example simulations.

TABLE 1

| Modules | Parameters | Area (nm$^2$) |
| --- | --- | --- |
| GLB | 1 MB | 5.655 |
| PE | 256 (16-bit) | 3.696 |
| QDRS | N/A | 0.665 |
| Adder | 2048 (4-bit) | 0.189 |
| MAC | 256 (4-bit) | 0.159 |

In particular, parameters and area for the global buffer (GLB), each processing element (PE), and the quantized dimension reduced searcher (QDRS) are shown. In addition, parameters and area for each adder included in the QDRS and each multiply-accumulate (MAC) circuit included in each PE are also shown.

Table 2 below shows the data sets and models used for testing in the simulations, along with the base accuracy of the data set and model on an Eyeriss architecture as base compared with that on the hardware accelerator depicted in FIGS. 7A, 7B, and 7C and simulated according to the variables of Table 1.

TABLE 2

| Dataset | Model | Base Accuracy | QDRS Accuracy |
| --- | --- | --- | --- |
| CIFAR-10 | VGG8 | 93.7% | 93.3% |
| CIFAR-10 | ResNet10 | 93.3% | 92.4% |
| ImageNet | AlexNet | 79.1% | 78.2% |
| ImageNet | VGG16 | 91.1% | 90.3% |
| ImageNet | ResNet18 | 89.1% | 88.2% |
| PTB | LSTM | 91.7% | 99.6% |

As shown in Table 2, the hardware accelerator depicted in FIGS. 7A, 7B, and 7C and simulated according to the variables of Table 1 (i.e., "QDRS" in Table 2) is within 1% as accurate at the Eyeriss architecture and is actually more accurate for the Penn Tree Bank (PTB) dataset applied to a long short-term memory (LSTM) model.

Figure 8A:
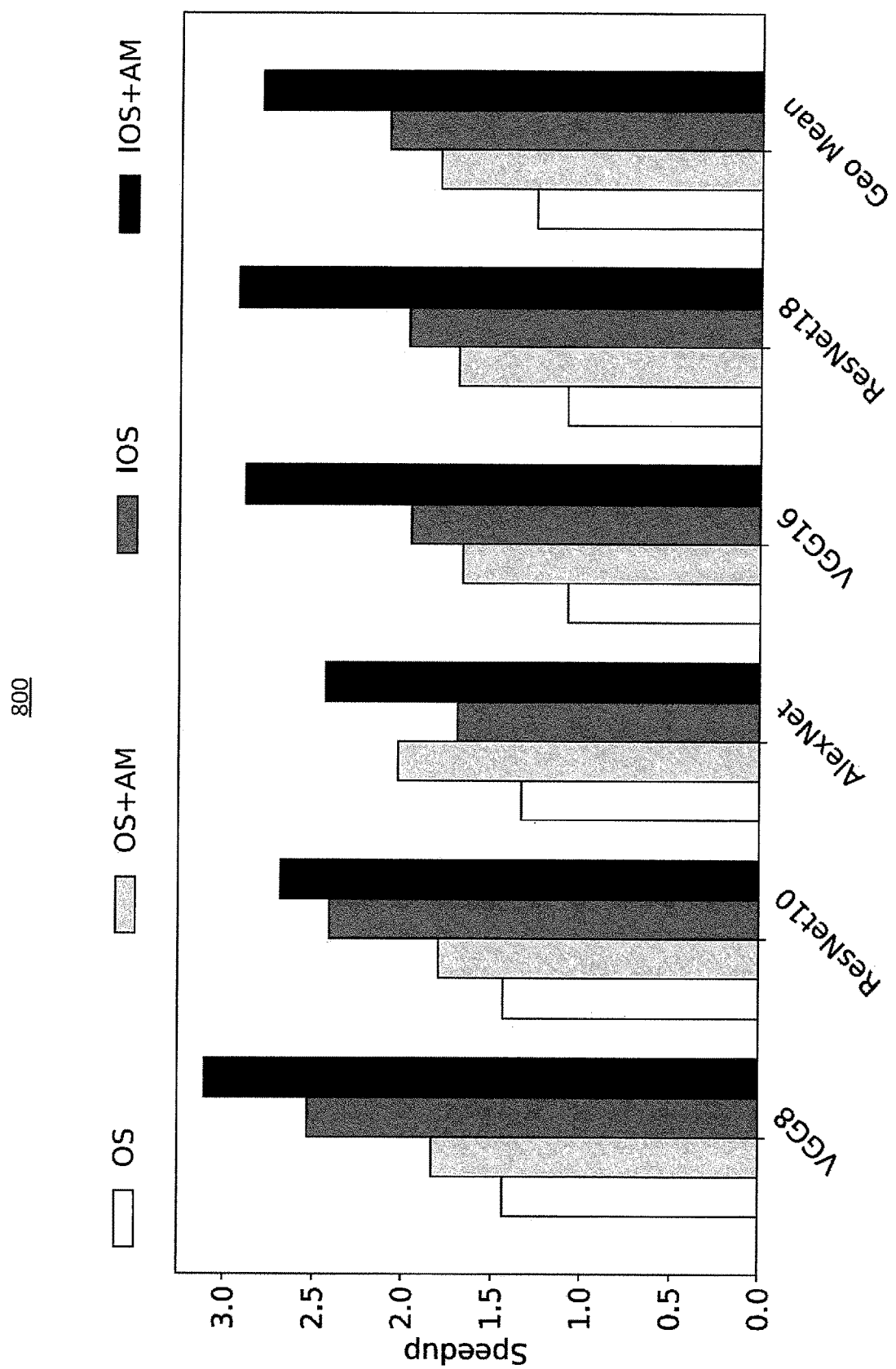
FIG. 8A is a graphical depiction of simulated overall speedup on convolutional neural network benchmarks by implementing one example of the embodiments of the present disclosure.

Moreover, as depicted in FIG. 8A, simulated use of the hardware accelerator depicted in FIGS. 7A, 7B, and 7C according to the variables of Table 1 may achieve an average speedup of 1.24× for six convolutional neural network (CNN) benchmarks when providing output sparsity ("OS"). In addition, FIG. 8A depicts how simulated use of the hardware accelerator depicted in FIGS. 7A, 7B, and 7C according to the variables of Table 1 may achieve an average speedup of 2.05× for the six CNN benchmarks when providing input sparsity in addition to output sparsity ("IOS"). FIG. 8A further depicts how simulated use of the hardware accelerator depicted in FIGS. 7A, 7B, and 7C according to the variables of Table 1 may achieve an average speedup of 1.76× and 2.71×, respectively, for the six CNN benchmarks when providing adaptive mapping with OS or IOS, respectively. Similar to Table 2, the speedups of FIG. 8A are with reference to the Eyeriss architecture as base.

Figure 8B:
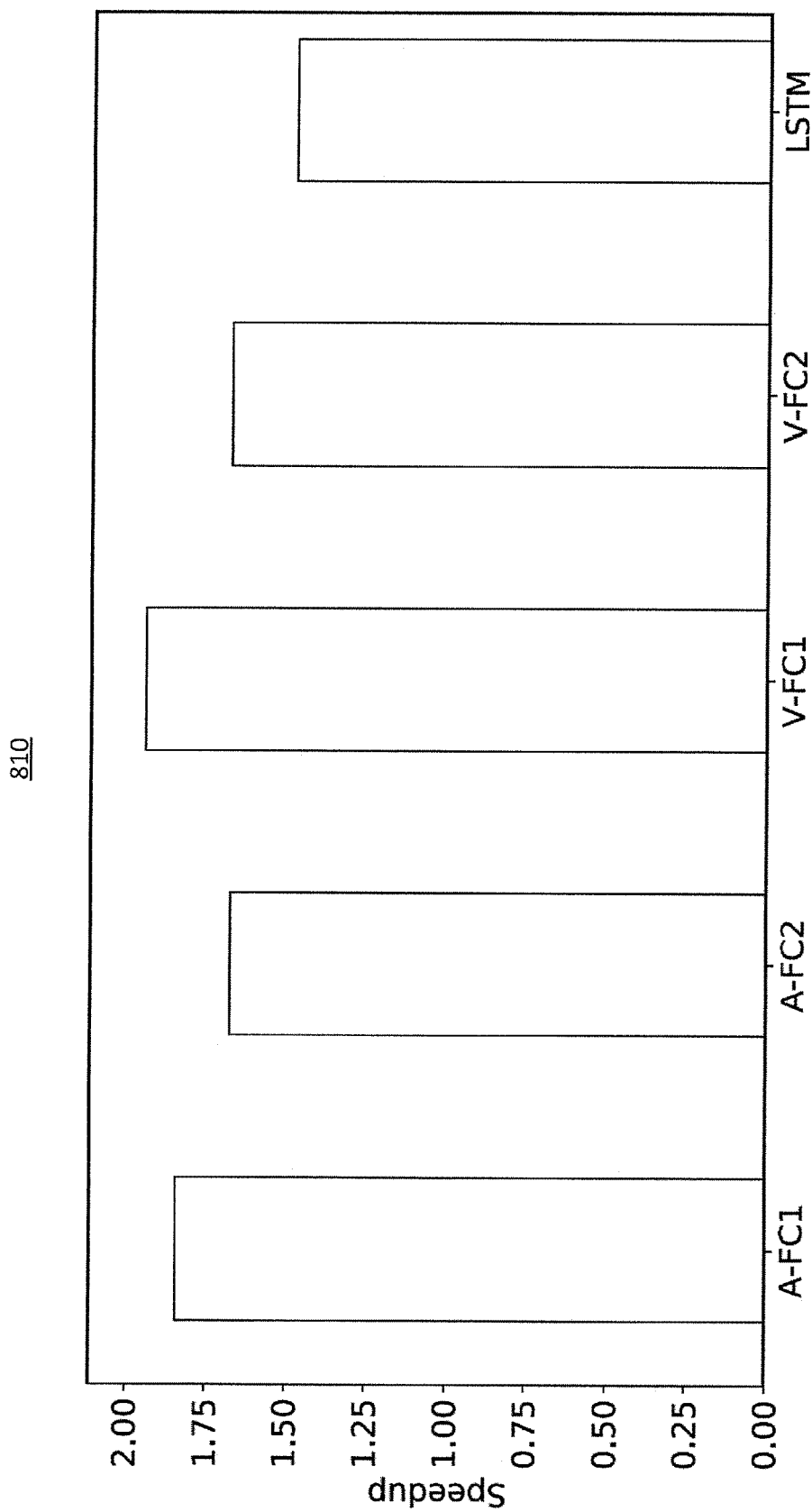
FIG. 8B is a graphical depiction of simulated overall speedup on fully connected layers and long short-term memory layers by implementing one example of the embodiments of the present disclosure.

FIG. 8B depicts overall speedup from the same simulations for the fully connected (FC) layers of AlexNet (i.e., A-FC1 and A-FC2), the FC layers of VGG16 (i.e., V-FC1 and V-FC2), and a long short-term memory (LSTM) layer. As shown in FIG. 8B, simulated use of the hardware accelerator depicted in FIGS. 7A, 7B, and 7C according to the variables of Table 1 may achieve speedup between 1.67× and 1.98× for the FC layers and speedup of 1.47× for the LSTM layer. Similar to Table 2, the speedups of FIG. 8B are with reference to the Eyeriss architecture as base.

Figure 8C:
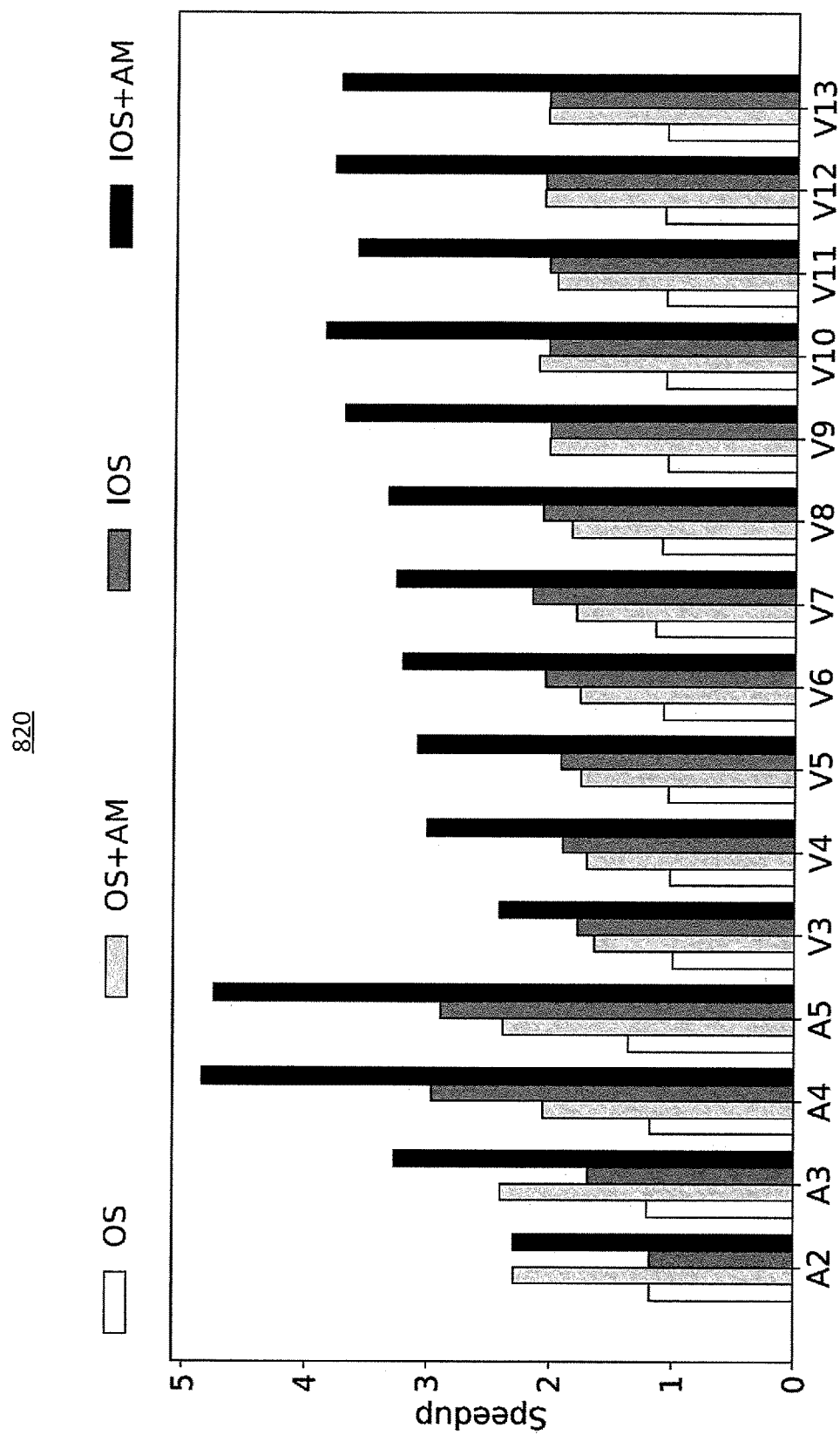
FIG. 8C is a graphical depiction of simulated overall speedup on convolutional layers by implementing one example of the embodiments of the present disclosure.

Moreover, as depicted in FIG. 8C, simulated use of the hardware accelerator depicted in FIGS. 7A, 7B, and 7C according to the variables of Table 1 may achieve an average speedup of 3.39× and a maximum speedup of 4.82× for the convolutional layers of AlexNet (i.e., A2, A3, A4, and A5) and VGG16 (i.e., V3, V4, V5, V6, V7, V8, V9, V10, V11, V12, and V13) when providing output sparsity ("OS"), input sparsity in addition to output sparsity ("IOS"), output sparsity with adaptive mapping ("OS+AM"), or input sparsity and output sparsity in combination with adaptive mapping ("IOS+AM").

Figure 8D:
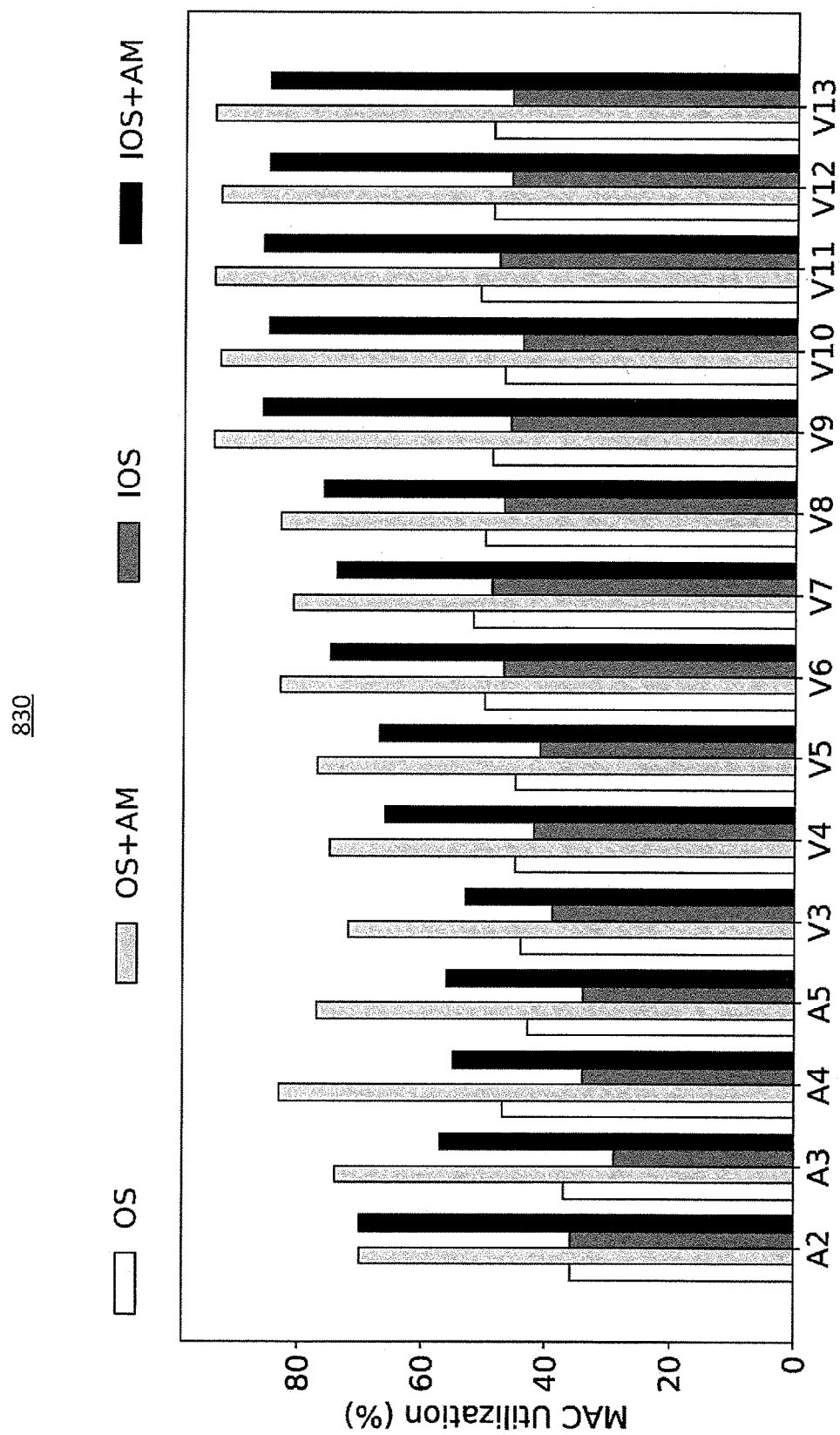
FIG. 8D is a graphical depiction of simulated multiply-accumulate (MAC) utilization of convolutional layers by implementing one example of the embodiments of the present disclosure.

FIG. 8D further shows how adaptive mapping (either "OS+AM" or "IOS+AM") increases MAC utilization within the hardware such that processing elements are not idling compared with only applying sparsity (either "OS" or "IOS").

Figure 9A:
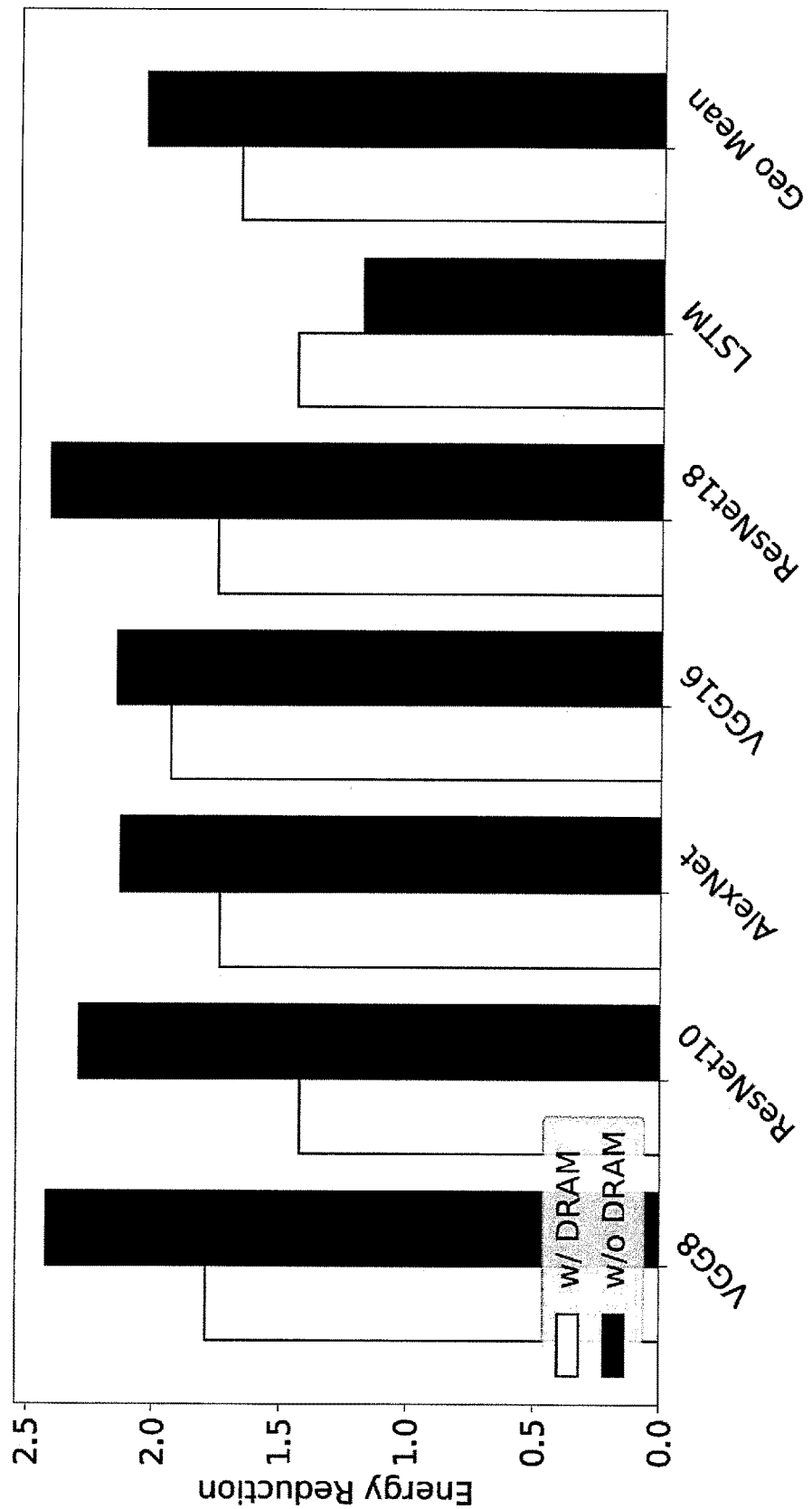
FIG. 9A is a graphical depiction of simulated energy reduction on convolutional neural network benchmarks by implementing one example of the embodiments of the present disclosure.
Figure 9B:
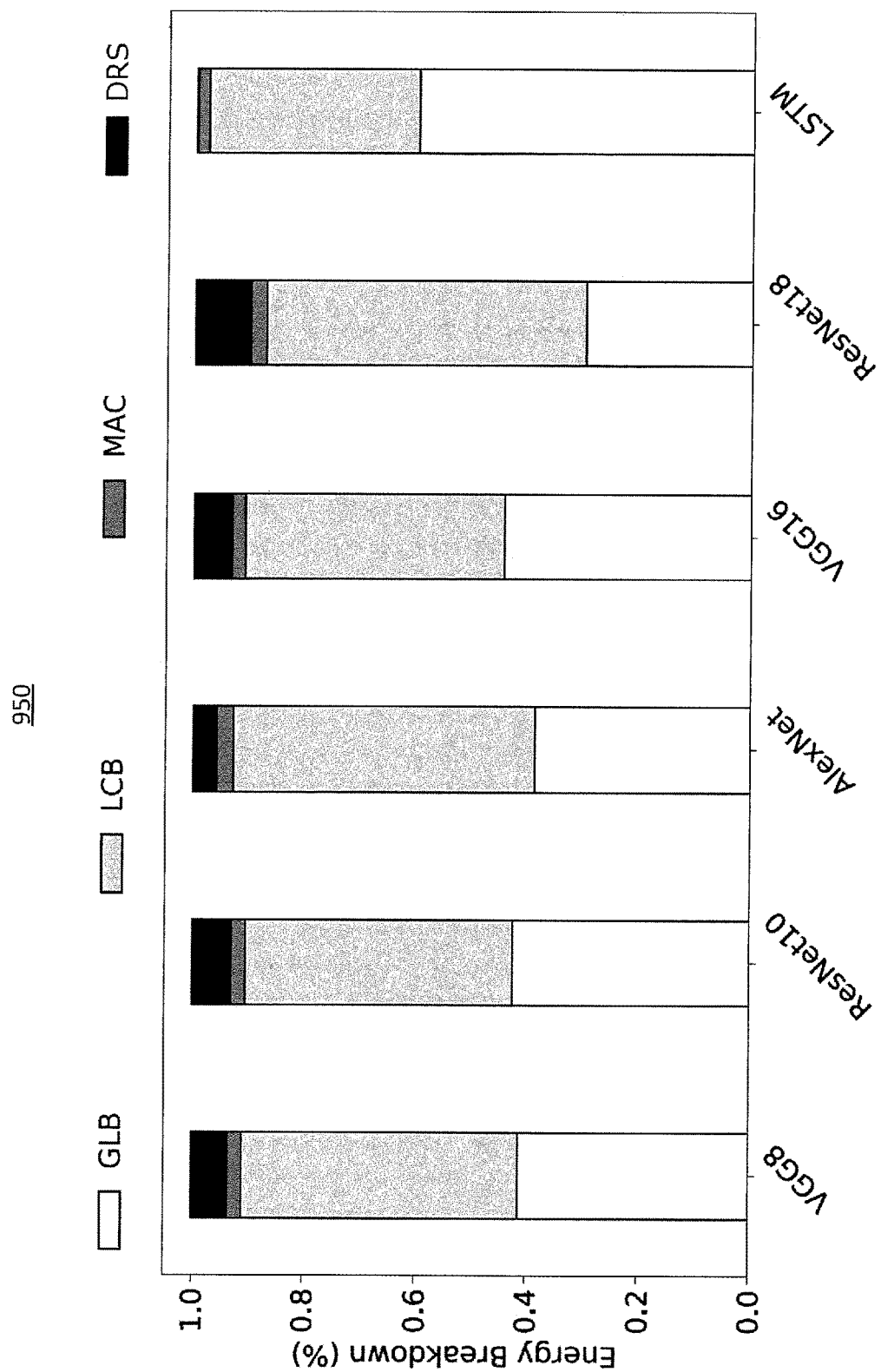
FIG. 9B is a graphical depiction of simulated energy overhead for the convolutional neural network benchmarks of FIG. 9A.

Moreover, as depicted in FIG. 9A, simulated use of the hardware accelerator depicted in FIGS. 7A, 7B, and 7C according to the variables of Table 1 may reduce energy consumption of an average of 1.64× for the six convolutional neural network (CNN) benchmarks and the LSTM model. When not accounting for energy usage from the memory (a dynamic random access memory (DRAM) in the example simulations), the average energy consumption is reduced by 2.02×. The energy breakdown depicted in FIG. 9B shows that the overhead for the QDRS component of the hardware accelerator depicted in FIGS. 7A, 7B, and 7C and simulated according to the variables of Table 1 is between 4.2% and 9.8% for the six CNN benchmarks and less than 1% for the LSTM model, which helps explain the energy gains of the hardware accelerator depicted in FIGS. 7A, 7B, and 7C and simulated according to the variables of Table 1 as compared to the Eyeriss architecture.

Figure 10A:
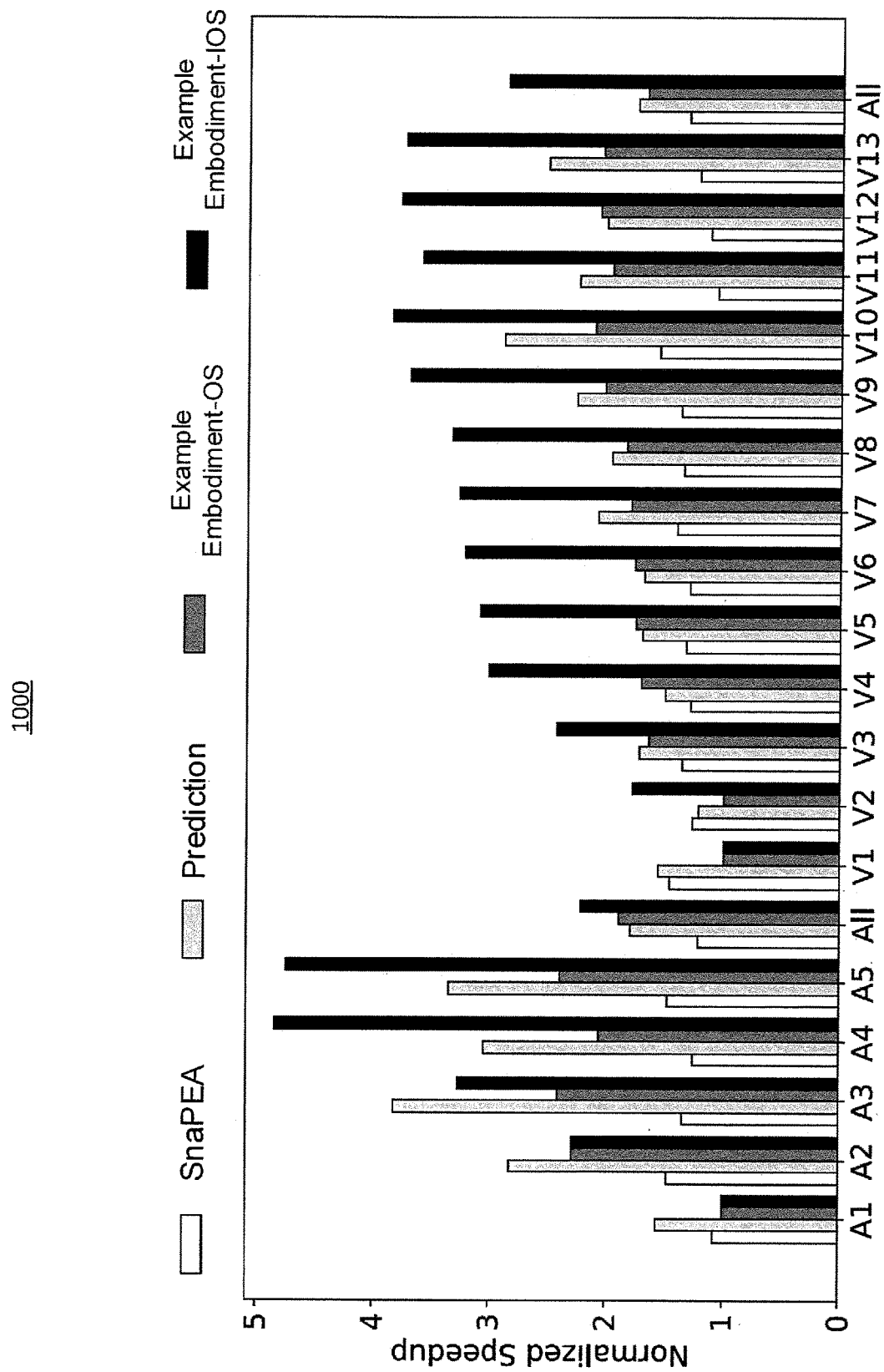
FIG. 10A is a graphical depiction of simulated normalized speedup on convolutional layers by implementing one example of the embodiments of the present disclosure as compared to two other sparsity techniques.

FIGS. 10A through 10D further show a comparison between simulated use of the hardware accelerator depicted in FIGS. 7A, 7B, and 7C according to the variables of Table 1 and simulated use of SnaPEA and Prediction, which provide output sparsity without adaptive mapping. FIG. 10A compares normalized speedup of the hardware accelerator depicted in FIGS. 7A, 7B, and 7C and simulated according to the variables of Table 1 for the layers of AlexNet and VGG16 when providing output sparsity ("SpaceX-OS"), the hardware accelerator depicted in FIGS. 7A, 7B, and 7C and simulated according to the variables of Table 1 for the layers of AlexNet and VGG16 when providing input sparsity in addition to output sparsity ("SpaceX-IOS"), SnaPEA ("SnaPEA"), and Prediction ("Predict"). As shown in FIG. 10A, adaptive mapping providing by the SpaceX accelerator depicted in FIGS. 7A, 7B, and 7C and simulated according to the variables of Table 1 provides the greatest speedup.

Figure 10B:
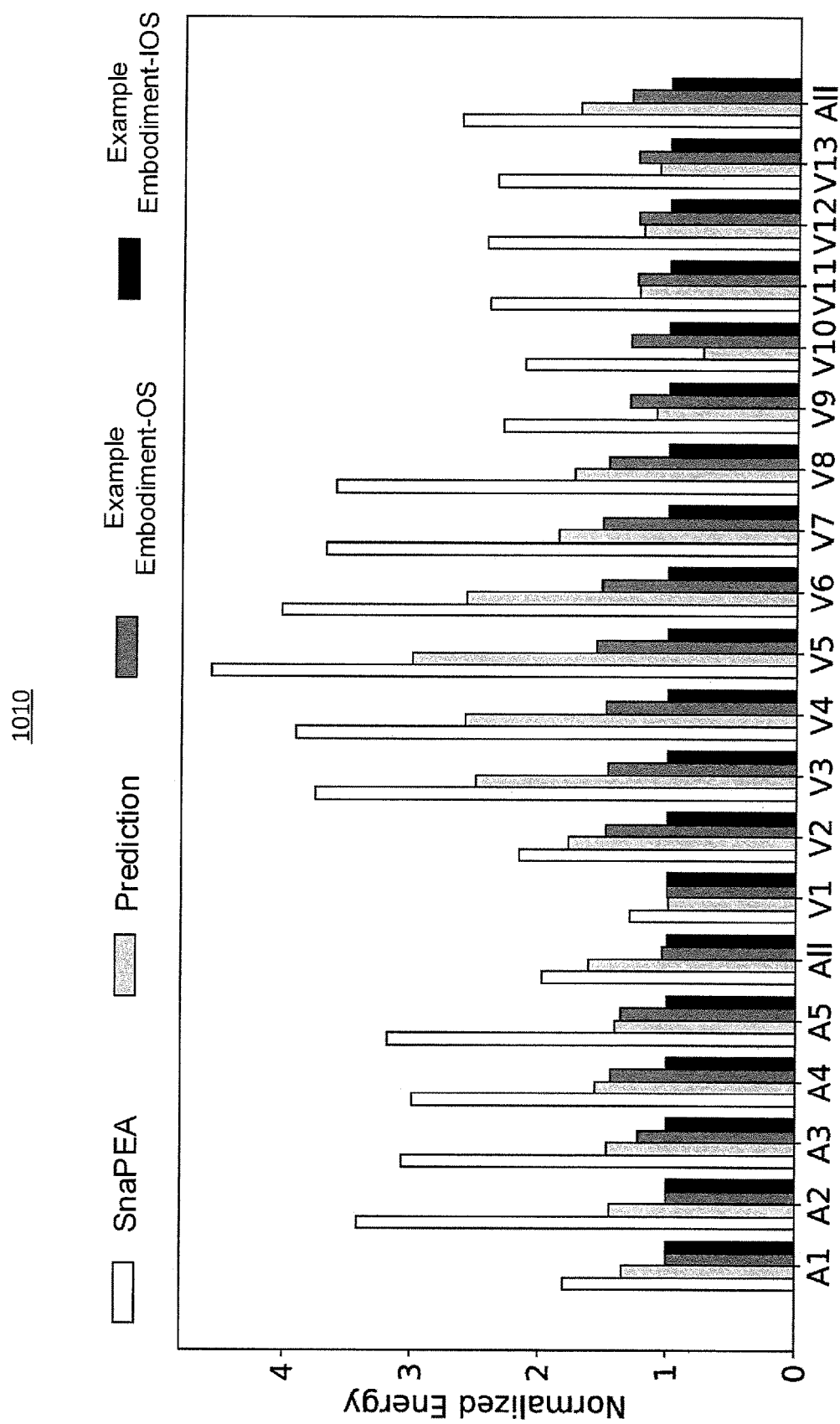
FIG. 10B is a graphical depiction of simulated normalized energy use on convolutional layers by implementing one example of the embodiments of the present disclosure as compared to two other sparsity techniques.

FIG. 10B compares normalized energy use of the hardware accelerator depicted in FIGS. 7A, 7B, and 7C and simulated according to the variables of Table 1 for the layers of AlexNet and VGG16 when providing output sparsity ("SpaceX-OS"), the hardware accelerator depicted in FIGS. 7A, 7B, and 7C and simulated according to the variables of Table 1 for the layers of AlexNet and VGG16 when providing input sparsity in addition to output sparsity ("SpaceX-IOS"), SnaPEA ("SnaPEA"), and Prediction ("Predict"). As shown in FIG. 10B, the SpaceX accelerator depicted in FIGS. 7A, 7B, and 7C and simulated according to the variables of Table 1 uses the least energy. Indeed, FIG. 10B shows that SnaPEA and Prediction consume 1.95× and 1.60× more energy than SpaceX on AlexNet, respectively, and 2.60× and 1.68× more energy than SpaceX on VGG16, respectively.

Figure 10C:
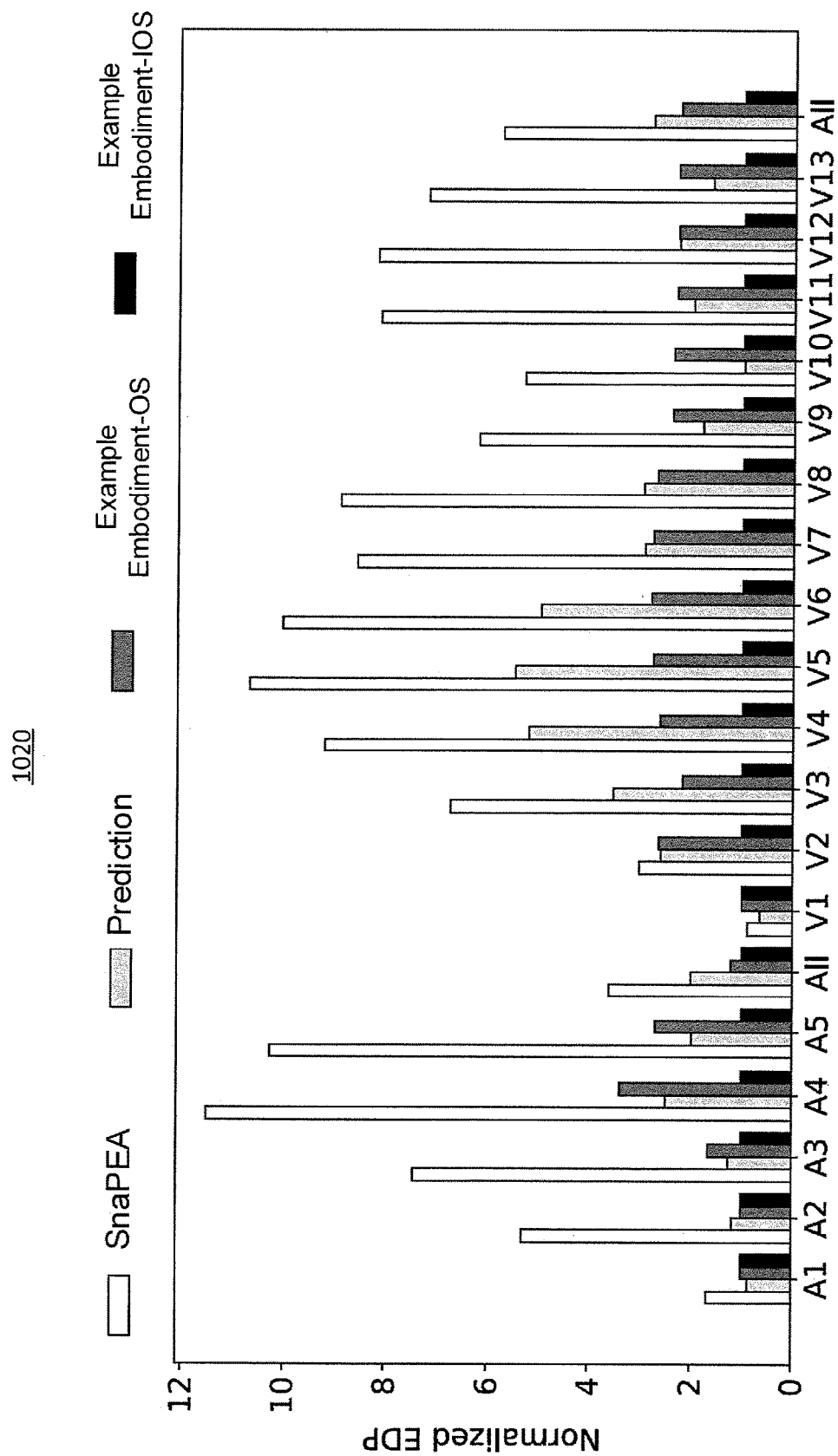
FIG. 10C is a graphical depiction of simulated normalized energy-delay product on convolutional layers by implementing one example of the embodiments of the present disclosure as compared to two other sparsity techniques.

FIG. 10C compares a normalized energy-delay product (EDP) of the hardware accelerator depicted in FIGS. 7A, 7B, and 7C and simulated according to the variables of Table 1 for the layers of AlexNet and VGG16 when providing output sparsity ("SpaceX-OS"), the hardware accelerator depicted in FIGS. 7A, 7B, and 7C and simulated according to the variables of Table 1 for the layers of AlexNet and VGG16 when providing input sparsity in addition to output sparsity ("SpaceX-IOS"), SnaPEA ("SnaPEA"), and Prediction ("Predict"). As shown in FIG. 10C, the SpaceX accelerator depicted in FIGS. 7A, 7B, and 7C and simulated according to the variables of Table 1 is the most efficient. Indeed, FIG. 10C shows that SnaPEA and Prediction have EDPs that are 3.52× and 1.91× more than SpaceX, respectively, and 5.71× and 2.70×more than SpaceX on VGG16, respectively.

Figure 10D:
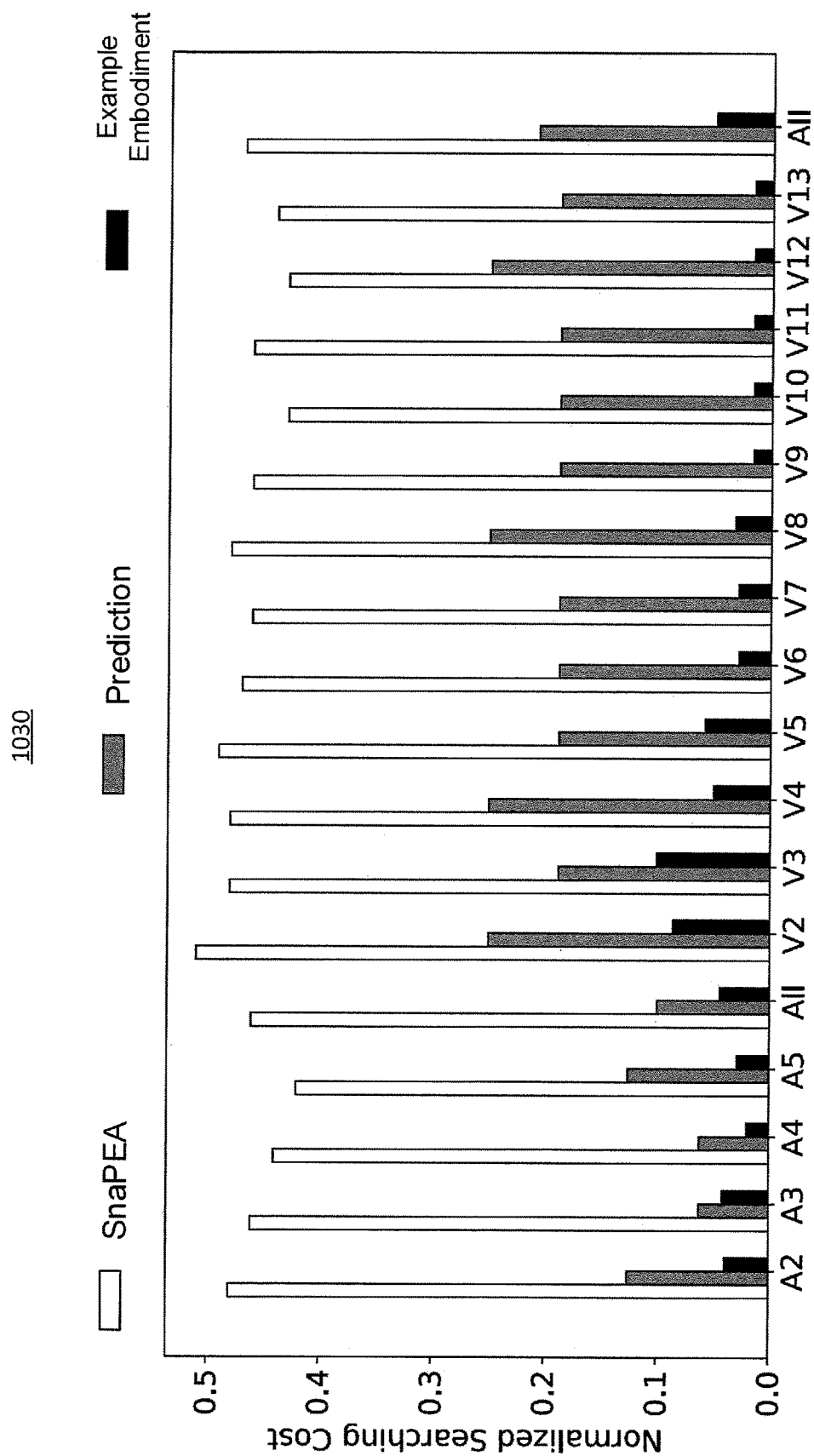
FIG. 10D is a graphical depiction of simulated normalized sparsity speculation cost on convolutional layers by implementing one example of the embodiments of the present disclosure as compared to two other sparsity techniques.

FIG. 10D compares normalized searching cost of the hardware accelerator depicted in FIGS. 7A, 7B, and 7C and simulated according to the variables of Table 1 for the layers of AlexNet and VGG16 ("SpaceX"), SnaPEA ("SnaPEA"), and Prediction ("Predict"). As shown in FIG. 10D, the SpaceX accelerator depicted in FIGS. 7A, 7B, and 7C and simulated according to the variables of Table 1 is most efficient at searching for neuron sparsity. Indeed, FIG. 10D shows that SnaPEA has a 45% search overhead on AlexNet and a 46% overhead on VGG16, and Prediction has a 9% search overhead on AlexNet and a 20% overhead on VGG16, while SpaceX has a 4% search overhead on AlexNet and a 5% overhead on VGG16.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as examples only, with the true scope and spirit of the disclosed embodiments being indicated by the following claims.

What is claimed is:

1. A system for dynamic sparse execution of a neural network, comprising:
at least one global buffer configured to receive inputs for the neural network;
a plurality of processing elements configured to execute activation functions for nodes of the neural network; and
at least one processor configured to:
execute ternary random projection to reduce at least one dimension of the inputs from the at least one global buffer and generate a corresponding predictable output neuron map for use by the plurality of processing elements, wherein the at least one dimension is reduced according to a tunable degree for indicating a degree at which missing values are to be predicted rather than calculated;
iteratively receive current outputs of a current layer from the plurality of processing elements as inputs of a next layer, wherein at least of one of the current outputs is expanded by setting values corresponding to one or more predictable output neurons;

reduce at least one dimension of the current outputs, and update the corresponding predictable output neuron map, based on the reduced current outputs, for use by the plurality of processing elements in generating next outputs until the plurality of processing elements have executed each layer of the neural network.

2. The system of claim 1, wherein each processing element comprises a control logic and a multiply-accumulate accelerator.

3. The system of claim 1, wherein the at least one processor comprises a plurality of adder trees.

4. The system of claim 1, wherein the global buffer is further configured to transmit the predictable output neuron map from the at least one processor to the plurality of processing elements and to transmit the outputs from the plurality of processing elements to the at least one processor.

5. The system of claim 1, wherein the plurality of processing elements are organized in an array along a first dimension and a second dimension.

6. The system of claim 5, wherein the plurality of processing elements share a first bus along the first dimension and communicate with the global buffer using a second bus along the second dimension.

7. The system of claim 1, wherein the at least one processor further comprises a systolic array configured to reduce at least one dimension of the set of weights for the neural network based on the reduced inputs.

8. The system of claim 7, wherein the systolic array is further configured to reduce at least one dimension of the set of weights for the neural network based on the reduced outputs.

9. The system of claim 1, wherein the plurality of processing elements and the at least one processor are configured to execute instructions in parallel.

10. The system of claim 9, wherein the at least one processor reduces at least one dimension of the outputs and updates the corresponding predictable output neuron map concurrently with execution of one or more of the activation functions by the plurality of processing elements.

11. The system of claim 1, wherein the at least one processor re-assigns the nodes to the plurality of processing elements whenever the predictable output neuron map is updated.

12. The system of claim 11, wherein re-assigning comprises grouping the activation functions based on the predictable output neuron map such that each group has the same number of calculations.

13. The system of claim 1, further comprising a quantizer configured to truncate the inputs before reducing at least one dimension of the inputs.

14. The system of claim 13, wherein the truncation comprises a truncation from 16 bit fixed-point values to 4-bit fixed-point values.

15. The system of claim 1, wherein the global buffer receives the inputs from a memory that is on a different chip from the global buffer.

16. The system of claim 15, wherein the global buffer is further configured to transmit final outputs to the memory.

17. The system of claim 1, wherein the plurality of processing elements further comprise local buffers for storing inputs and outputs.

18. A method for dynamic sparse execution of a neural network, comprising:

providing, via a buffer, inputs for a neural network to at least one processor;

executing, via the at least one processor, ternary random projection to reduce at least one dimension of the inputs according to a tunable degree for indicating a degree at which missing values are to be predicted rather than calculated;

generating, via the at least one processor, a corresponding predictable output neuron map;

executing, via a plurality of processing elements, one or more first activation functions of the neural network using the reduced inputs to generate first outputs, wherein at least one of the first outputs is expanded using the corresponding predictable output neuron map;

providing, via the buffer, the first outputs to the at least one processor;

reducing, via the at least one processor, at least one dimension of the first outputs;

updating, via the at least one processor, the corresponding predictable output neuron map based on the reduced first outputs; and executing, via the plurality of processing elements, one or more second activation functions of the neural network using the reduced first outputs to generate second outputs, wherein at least one of the second outputs is expanded by setting values corresponding to one or more second predictable output neurons.

19. A non-transitory computer-readable storage medium storing a set of instructions that is executable by a computing device to cause the computing device to perform a method for dynamic sparse execution of a neural network, the method comprising:

providing, via a buffer, inputs for a neural network to at least one processor;

executing, via the at least one processor, ternary random projection to reduce at least one dimension of the inputs according to a tunable degree for indicating a degree at which missing values are to be predicted rather than calculated;

generating, via the at least one processor, a corresponding predictable output neuron map;

executing, via a plurality of processing elements, one or more first activation functions of the neural network using the reduced inputs to generate first outputs, wherein at least one of the first outputs is expanded by setting values corresponding to one or more first predictable output neurons;

providing, via the buffer, the first outputs to the at least one processor;

reducing, via the at least one processor, at least one dimension of the first outputs;

updating, via the at least one processor, the corresponding predictable output neuron map based on the reduced first outputs; and executing, via the plurality of processing elements, one or more second activation functions of the neural network using the reduced first outputs to generate second outputs, wherein at least one of the second outputs is expanded by setting values corresponding to one or more second predictable output neurons.

* * * * *